US008229787B2

(12) United States Patent
Ramchandani et al.

(10) Patent No.: US 8,229,787 B2
(45) Date of Patent: *Jul. 24, 2012

(54) CUSTOMER RELATIONSHIP MANAGEMENT SYSTEM FOR PHYSICAL LOCATIONS

(75) Inventors: Jayant Ramchandani, Fremont, CA (US); Asif Ghias, San Francisco, CA (US)

(73) Assignee: Novitaz, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/101,932

(22) Filed: May 5, 2011

(65) Prior Publication Data

US 2011/0276382 A1 Nov. 10, 2011

Related U.S. Application Data

(63) Continuation of application No. 10/290,008, filed on Nov. 7, 2002, now Pat. No. 7,962,361.

(51) Int. Cl.
*G06Q 30/00* (2012.01)

(52) U.S. Cl. ............... 705/14.25; 705/14.23; 705/14.53; 705/14.58; 705/14.67; 705/14.64

(58) Field of Classification Search ............... 705/14.25, 705/14.23, 14.53, 14.58, 14.64, 14.67, 26
See application file for complete search history.

(56) References Cited

U.S. PATENT DOCUMENTS

| | | | | |
|---|---|---|---|---|
| 6,587,835 B1 * | 7/2003 | Treyz et al. | ................. | 705/14.64 |
| 2003/0195812 A1 * | 10/2003 | Nguyen | ........................... | 705/26 |
| 2004/0153368 A1 * | 8/2004 | Freishtat et al. | ................. | 705/26 |

FOREIGN PATENT DOCUMENTS

WO WO97/23838 * 7/1997

OTHER PUBLICATIONS

AIM International ("Radio Frequency Identification RFID, A basic primer", 1998, pp. 1-17).*
Canada NewsWire, Royal Band and BC-based Emex marketing technologies launch loyalty pilot program for Visa Credit cardholders, Aug. 31, 2000, p. 1.*
Scharfeld, An Analysis of the fundamental constraints on low cost passive radio-frequency identification system design, Aug. 2001, Massachusetts Institute of Technology, pp. 1-115.*
Pentland et al, Face recognition for smart environments, Feb. 2000, Computer, vol. 33, Issue 2, pp. 50-55.*
AIM International ("Radio Frequency Identification RFID, A Basic Primer", 1998, pp. 1-17.*

* cited by examiner

*Primary Examiner* — John Van Bramer
(74) *Attorney, Agent, or Firm* — Fenwick & West LLP

(57) ABSTRACT

A method for outputting information about a person includes identifying the person utilizing a wireless system upon entry into a physical location, and also includes locating the person within the physical structure. An engagement plan is retrieved based on the identification of the person and output. The engagement plan has information useful for interacting with the person. The engagement plan is created based at least in part on personal information of the person, the preferences of the person, and the past transactions of the person. A system for outputting information about a person, such as a customer, includes an object carried by the person, which is capable of being identified by a wireless system. A wireless interface communicates with the object. A computing device correlates the identification of the object with the person. An output device outputs information relating to the person.

58 Claims, 17 Drawing Sheets

400

402

| Sample Restaurant Engagement Plan (for Service Provider) | | | |
|---|---|---|---|
| Profile | | Preferences | |
| Name | Ron Nelson | Seating | 1. Window – Table 11 |
| Zip Code | 94312 | | 2. Window – Table 15 |
| Status | Platinum | | 3. Window – Table 18 |
| Dining Speed | Leisurely | Waiters | 1. Chris Marks |
| Customer Since | 1991 | | 2. Ray James |
| Average Session | 2 hours 30 minutes | | 3. Becky Dwight |

Key Engagement Message — 404

Absolutely do not hurry Ron.

Memos

| Date | Sales Rep | Memo |
|---|---|---|
| 10/12/02 | Chris Marks | Ron likes to take his time over dessert and coffee |
| 06/15/02 | Chris Marks | Likes the food spicy |
| 02/15/02 | Becky Dwight | Ron is a red wine connosuier. He loves sampling our new South African Wines |

— 406

Food Preferences

| Course | Entrée | Notes |
|---|---|---|
| Appetizer | Papaya Salad | |
| Main Course | Mongolian Beef | Likes it a little on the spicier side |
| Dessert | Sorbets | Only non-dairy desserts for Ron |

— 408

Beverage Preferences

| Beverage | Brand | Notes |
|---|---|---|
| Wine | Johannesburg Merlot | Offer the half bottle when it is a party of two |

Sample Retailers Engagement Plan (for Service Provider) — 602

Profile

| | | Departments | | |
|---|---|---|---|---|
| Name | Beth Page | | 1. | Women's Apparel |
| Zip Code | 94312 | | 2. | Home Furnishings |
| Status | Platinum | | 3. | Kids |
| Shopping Speed | Fast | Sales Clerks | 1. | Chris Marks |
| Customer Since | 1993 | | 2. | Ray James |
| Average Session | 30 minutes | | 3. | Becky Dwight |

Preferences (see above)

Key Engagement Message

Ensure that Beth finds everything she is looking for. Check with her half way through the session.

Memos — 604

| Date | Sales Rep | Memo |
|---|---|---|
| 10/12/02 | Chris Marks | Looking for a unique valentine gift for her husband who enjoys sports |
| 06/14/02 | Chris Marks | Will be vacationing in the Bahamas. Wants to shop for the trip |
| 02/15/02 | Becky Dwight | Has recently remodeled her kitchen. Looking for new cutlery and crockery |

600

Fig. 17

REPLACEMENT DRAWING

| | Method | | | | |
|---|---|---|---|---|---|
| | Electromagnetic Coupling 400~530KHz | Electromagnetic Induction 120~150KHz 13.56MHz | Microwave 2.45GHz | Light Infrared (670nm) | |
| Communication Frequency | Δ ~150mm | o ~500mm | o ~5mm | o ~300mm | electromagnetic coupling |
| Communication Distance | o | Δ | o | o | R/W type |
| Stabilized communication | o | Δ | o | o | Stability in noise environments |
| Communication Speed | Δ | × | o | o | Depends on frequency |
| Communication Directivity | o | Δ | × | o | Depends on frequency |
| Reflection/interference | o | Δ | o | o | Interference between antenna |
| Electromagnetic Field | o | o | o | Δ | Inverter, motor, etc. |
| Light Resistance | o | o | Δ | × | Sunbeam, fluorescent light |
| Water proof/oil proof | o | o | Δ | × | From theoretical and structural |
| Chemical Resistance | o | o | o | o | From theoretical and structural |
| Stain proof/communication | o | Δ | Δ | o | From theoretical and structural |
| Conformity to wave regulation | o | o | o | o | Requirements of application |
| Conformity to outside regulation | | | | | USA, FCC, EC ETSI, etc. |

Excellent O > o > Δ > × Poor

CUSTOMER RELATIONSHIP MANAGEMENT SYSTEM FOR PHYSICAL LOCATIONS

RELATED APPLICATION

This application is a continuation of U.S. patent application Ser. No. 10/290,008 entitled "Customer Relationship Management System for Physical Locations" filed on Nov. 7, 2002, which is incorporated by reference herein.

FIELD OF THE ART

The present invention relates to customer relationship management, and more particularly, this invention relates to customer relationship management in a physical environment.

BACKGROUND

Modern society has created a plethora of ways to provide goods and services to customers. However, physical locations continue to be the predominant forums preferred by customers. Whatever the type of business, be it retail stores, banks, restaurants, patio cafes, or any other type business, customers prefer to interact directly with the providers of the goods and services. Physical locations include what is referred to herein as Brick and Mortar (BM) establishments, i.e., those places a customer can physically go to purchase goods, receive services, etc.

The most prominent examples of Physical Locations where commerce is transacted are Brick and Mortar Retail Establishments. However, the scope of the invention not only applies to retail establishments, but can also be applied to other physical locations such as banks, restaurants, hospitals, sports arenas, amusement parks etc.

Retail is the second-largest industry in the United States both in number of establishments and number of employees. It is also one of the largest worldwide. The retail industry employs more than 22 million Americans and generates more than $3 trillion in retail sales annually.

Over 93% of all sales take place in retail stores, meaning that an opportunity exists to interface directly with the customer. However, the limitations of heretofore known Customer Relationship Management (CRM) tools is that when a customer walks in the door of a retail establishment there is no means of obtaining the customer profile. That is, in the window of time between the customer walking in the door until the customer is at the Point-Of-Sale (POS), a retail store does not know the customer profile and therefore cannot service the customer properly. This is unlike the web, where a returning customer is immediately identified upon entering the homepage.

Proper servicing is critical to customer retention. It is estimated that a five percentage point increase in customer retention in a typical company will increase profits by more than 25%, and growth by more than 100%. Customer loyalty also accelerates growth. The typical Fortune 500 company, for example, has real annual growth of 2½%. If it retains 5% more of its customers each year, real growth will triple to 7½%.

From a perspective of customer service at the Brick and Mortar level, the "As-Is" situation is that there is no mechanism to effectively service the customer based on his profile, preferences and transaction history, or at best these mechanisms are very ad-hoc and un-automated. The only service that currently exists in a BM establishment, is in the form of incentives given after a transaction in order to entice the customer to return. These incentives vary from loyalty cards (buy 9 get the 10th free), to gift certificates. However, these incentives have are very limited in their effectiveness, because they are offered at the end of the transaction—which is too late.

The following two data-points illustrate the severe limitations of the As-Is situation from a revenue and profitability perspective:

According to IBM Consulting, the top 5% of retail customers generally contribute 20% to 25% of sales revenues and 25% to 45% of profits. And according to Bain & Co., a 5% increase in customer retention can produce profit increases as high as 125% However, even though over 93% of retail sales happen in retail establishments, a retailer using any of the above-described systems cannot identify a top 5% customer when she walks in the door. Nor can a retailer service customers appropriately to increase retention. Nor can the retailer convert a new customer who has the potential to spend like a top 5% customer does, into a loyal customer.

What is needed is a system and method to address all three of the limitations discussed in the previous paragraph.

Further, in most situations, a retailer/service provider has few or no methods to solicit, capture and respond to customer feedback. It needs tools to effectively manage the business based on actual customer experiences. In addition, it lacks formalized pre-sales customer service. Customer service is disjointed, roles and responsibilities are not clearly defined, and standards for customer communications and corrective actions are lacking.

The present invention solves the aforementioned problems, and improves on prior art attempts to provide CRM, by providing a new design that assists the enterprise in the following, in the context of brick and mortar establishments:

Identifies a customer as soon as she walks in the door

Locates a customer within a Physical Store

Syncs up with the corporate CRM system to get a "holistic-view" of customer. This includes preferences based on past transactions, which occurred on all channels for interacting with customers. The channels include physical store, ecommerce web-sites, catalog sales, telesales Alerts service provider with customer's preferred status Provides service provider with possible cross-sells/up-sells for the customer Provides service provider with memos of prior engagements with the customer Creates an engagement plan for a customer Allows for data input after each interaction to improve the engagement plan for future transactions Disseminates the engagement plan to the service provider servicing the customer Uses a Cookie-based session concept to manage a customer session at a store in the same manner as a software cookie is used to start and manage an eCommerce session on the Web, thus providing valuable customer behavior data in order to create a holistic view of the customer Interfaces with POS system to determine if a new customer qualifies for new incentives Interfaces with POS to determine incentives and print incentives on receipt Captures the customer transaction in a physical location as part of the session Performs analytics on the session information in order to enable corporate to get detailed insights into the customer transactions Allows corporate to send key engagement messages to the service providers at the physical location

SUMMARY

The present invention provides solutions for enhanced customer experience for businesses conducted in "brick and mortar" establishments. As mentioned above, the notion of "brick and mortar" establishments encompasses physical locations. The embodiments of the present invention disclosed herein allow personalized service to the customer from the moment of his/her arrival in the facility. It enables targeted marketing and sales promotions (up-sell/cross-sell) for individual customers, much prior to the POS touch-point (checkout lanes). Furthermore, for the first time, it extends the full powers of an e-CRM system to a traditional brick-and-mortar business. All of this consequently empowers businesses to provide enormously improved customer focus and presales, sales, and post-sales service thereby greatly increasing customer retention and loyalty.

According to one embodiment, a method for outputting information about a person such as a customer includes identifying the person utilizing a wireless system. An engagement plan is retrieved based on the identification of the person and output. The engagement plan has information useful for interacting with the person. Such information can include suggestions, strategies, explicit instructions, etc. The engagement plan is created based at least in part on personal information of the person. Personal information refers to any type of information associated with that person, such as name, transaction history, preferences, account number, user identification number, his/her current needs, (e.g. he just got married, or bought a home, or needs a gift for his upcoming anniversary) etc.

A system for outputting information about a person such as a customer is also provided. An object capable of being identified by a wireless system is carried by a person. A wireless interface communicates with the object. A computing device correlates the identification of the object with the person. An output device outputs information relating to the person.

The wireless technology that can be used in conjunction with this and other embodiments includes Radio Frequency Identification (RFID), smart cards, or any other type of wireless technology. The preferred wireless technology does not require line-of-site to the reader, so that an object in a wallet or purse can still be read without removing it. Note that contact-based systems can also be used.

Methodology for personalized marketing is provided by one embodiment. A person is identified utilizing a wireless system. Personal information about the person is retrieved based on the identification. A physical position i.e., geographical or positional location, of the person is determined. Product information is selected based at least in part on the personal information of the person. The product information is output near the physical position of the person, i.e., within the person's range of sight and/or hearing. The output can be visual, auditory, physical (paper coupon), etc.

A process for using information about a prior interaction relating to a product is provided by yet another embodiment. A person is identified. Likewise, an interaction of the person with a product is also identified. Information about the interaction of the person with the product is logged. The person is identified in a BM establishment (store, restaurant, bank, etc.) utilizing a wireless system. An engagement plan based on the interaction is output, as is the engagement plan a description of the product information viewed by the person such as name, picture, etc. of the product.

A method for outputting information about a person such as a customer includes identifying an object such as a card with a magnetic stripe, etc. utilizing a computerized system. An identification of the person pre-associated with the object is also made. An engagement plan is retrieved and output based on the identification of the person. The engagement plan has information useful for interacting with the person, and is created based at least in part on personal information of the person.

According to yet another embodiment, a method for outputting information about a person such as a customer includes identifying a person upon entry into a predefined area such as into a BM establishment. A session is initiated upon identifying the person. A location of the person within the predefined area is determined. The person is serviced based on the location of the person in the predefined area, a profile of the person, and a past transaction of the person. This includes, but is not limited to, past transactions which have occurred in any of the following four distinct channels (a.k.a. touch-points): Brick and Mortar, eCommerce, Catalogue and Telesales. Behavioral details of the person are captured during the session, preferably at a Brick and Mortar Retail Establishment as a Brick and Mortar Session in a manner similar to a customer session captured on an ecommerce website. The behavioral details of the person are catalogued. Details of the session are communicated to customer relationship management (CRM) software.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 depicts an illustrative restaurant engagement plan.

FIGS. 6A-B depict illustrative retail engagement plans.

FIG. 17 is a table listing characteristics of various types of RFID systems that can be used with embodiments of the present invention.

DETAILED DESCRIPTION

The following description is the best embodiment presently contemplated for carrying out the present invention.

This description is made for the purpose of illustrating the general principles of the present invention and is not meant to limit the inventive concepts claimed herein.

CRM Hardware/Software System

Figure 1:
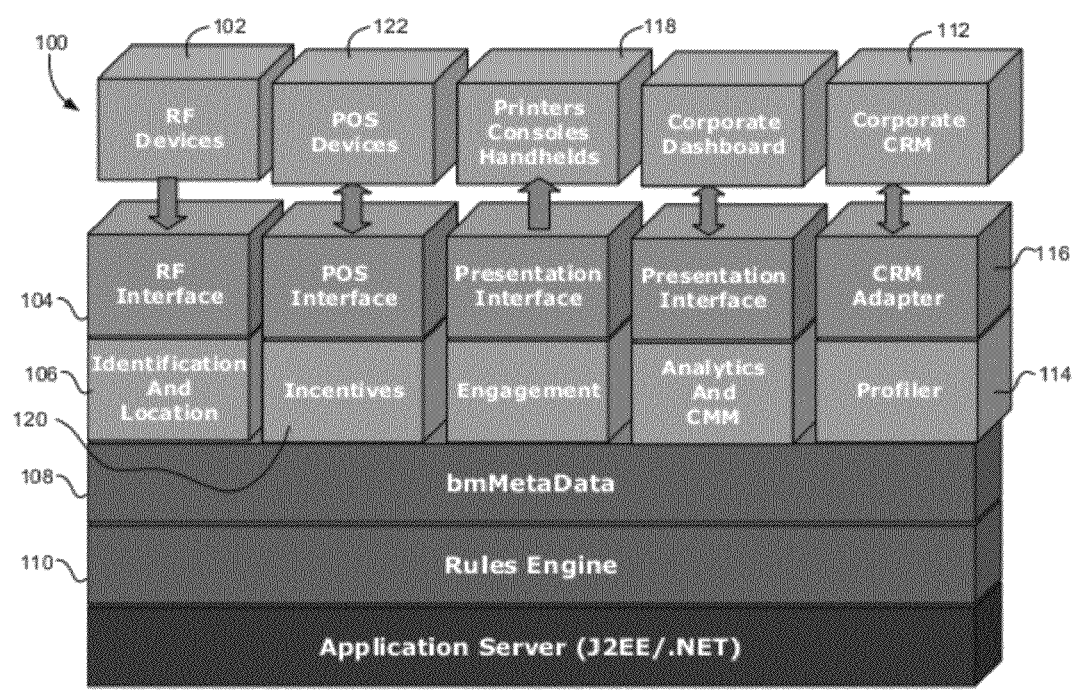
FIG. 1 is a system diagram of a wireless CRM system according to one embodiment of the present invention.

FIG. 1 depicts a wireless CRM system 100 according to one embodiment of the present invention. As shown, a radio frequency (RF) device or object 102 capable of being identified by the wireless system is carried by a person such as a customer, client, delivery person, or anyone interacting with the business. For simplicity, the following description will refer to a "customer," with "customer" meaning anyone interacting with the business or system.

The wireless technology that can be used in conjunction with this and other embodiments includes Radio Frequency Identification (RFID), smart cards, or any other type of wireless technology. The preferred wireless technology does not require line-of-site to the reader, so that an object in a wallet or purse can still be read without removing it. Thus, the device carried by the customer can be any device capable of being identified by a wireless system, such as a smart card, an RFID tag, etc. Note that contact-based systems can also be used, as noted below.

Smart cards are one preferred device because they are able to make maximum use of information available at the point of sale (customer purchasing history, number of points accrued, etc.) and allow instant rewards. Smart cards hold portable files, securely holding personal information about customer profiles, purchasing behavior and histories. Smart cards are suitable for operations with multiple partners, plus offer the possibility of adding or deleting partners, including after card issuance. Smart cards also facilitate home-shopping loyalty programs on the Internet, and are the bridge between the world of e-commerce and real-world points of sale in "brick and mortar" establishments.

RFID is discussed below in the section entitled "Overview of RFID." Other items include RFID-chipped objects such as key chains and mobile phone covers that are typically more exposed than a card in a wallet or purse and are thus more easily read. Preferably, the object is capable of being identified by the wireless system without requiring a line of sight to the object. This allows the system to identify the object even though it is stored in a pocket, wallet, purse, etc.

A wireless interface 104 is provided for communicating with the object. An identification module 106 identifies the RF Tag and correlates the device to the customer. A meta data model 108 is used in conjunction with a rules engine 110 as the basis for cataloguing customer behavior and also serves as the basis for communicating the details of a session to the corporate CRM software/system 112 via an adapter interface 114. Preferably, the system can integrate with any already-existing CRM system, allowing the company implementing the new system to retain its investment in the prior system.

A profiler 116 generates an engagement plan based on personal information of the customer. An output device 118 outputs the engagement plan and/or identification information about the customer for assisting a user to identify the customer. For example, the identification information may include a visual likeness of the customer.

An incentive module 120 in combination with a point of sale (POS) device 122 outputs incentives (coupons, rebates, etc.) with the customer's amount due for services, products, etc. The incentive module also communicates with the output device 118.

Additional wireless interfaces can be provided to allow tracking of physical movement of the customer via, for example, triangulation. During tracking, the output device can output a physical location of the customer. Further, product information can be selected based at least in part on the personal information of the customer. The product information is output near the customer, i.e., within the customer's range of sight and/or hearing. The output can be visual, auditory, physical (paper coupon), etc.

The system preferably provides the following functionality:
- CRM analytics
- Customer relationship optimization (CRO)
- Marketing
- Marketing resource management (MRM)
- Ad management services The CRM system enables customer identification based on customer profile at the store level when the customer walks in to a Brick and Mortar establishment. The following are a list of preferred features of the system:
- Identifies a customer as soon as she walks in the door
- Locates a customer within a Physical Store
- Syncs up with the corporate CRM system to get a "holistic-view" of customer. This includes preferences based on past transactions, which occurred on all channels for interacting with customers. The channels include physical store, ecommerce web-sites, catalog sales, telesales
- Alerts service provider with customer's preferred status and preferences
- Provides service provider with possible cross-sells/up-sells for the customer
- Provides service provider with memos of prior engagements with the customer
- Creates an engagement plan for a customer
- Allows for data input after each interaction to improve the engagement plan for future transactions
- Disseminates the engagement plan to the service provider servicing the customer
- Uses a Cookie-based session concept to manage a customer session at a store in the same manner as a software cookie is used to start and manage an eCommerce session on the Web, thus providing valuable customer behavior data in order to create a holistic view of the customer
- Interfaces with POS system to determine if a new customer qualifies for new incentives
- Interfaces with POS to determine incentives and print incentives on receipt
- Captures the customer transaction in a physical location as part of the session
- Performs analytics on the session information in order to enable corporate to get detailed insights into the customer transactions
- Allows corporate to send key engagement messages to the service providers at the physical location The present invention preferably assists the enterprise to:
- Identify their customers
- Interact with customers who may be resistant to providing information on themselves
- Invest more in the systems used at the point of customer contact
- Become smarter in using the information already at hand
- Make doing business simpler, including products and offers
- Understand the real economics of each customer
- Develop a realistic set of business needs (i.e., vs. the wants and desires)
- Listen to customers more, and ensure that they feel reassured at each step, and that their data is protected
- Define processes for gathering feedback from its customers and processes for servicing its customers Provide collaboration from throughout the organization Use a database of information about its customers and mining that data to improve customer relationships and increase revenue Improve the customer experience by acting on feedback received from its customer surveys and offering customer loyalty programs Use metrics to measure its success, enabling it to show measurable results from its CRM efforts Provide instant rewards at the point of sale Maintain multi-step campaigns to increase the effectiveness of campaigns by specifying follow-up interactions with each customer, including utilizing alternative channels such as direct mail or call center Deliver consistent communications across all marketing channels-in-store, call center, and online Profitable Interaction Centers: Siebel Marketing, when combined with Siebel Call Center, improves the effectiveness of both outbound telemarketing campaigns and inbound call handling, and helps transform customer interaction centers into profitable revenue sources that execute coordinated multichannel marketing programs. Agents are able to execute real time marketing campaigns and deliver targeted offers that reflect knowledge of all marketing campaigns across all channels, quickly resulting in higher sales and greater customer satisfaction In a variation of the system described with respect to FIG. 1, a reader that requires physical contact with the identifying object can be used. For example, a card reader can be positioned at the entry to a store. Upon entering, the customer would swipe the card through the reader, which in turn would read a magnetic stripe on the card and thereby identify the customer.

Figure 2:
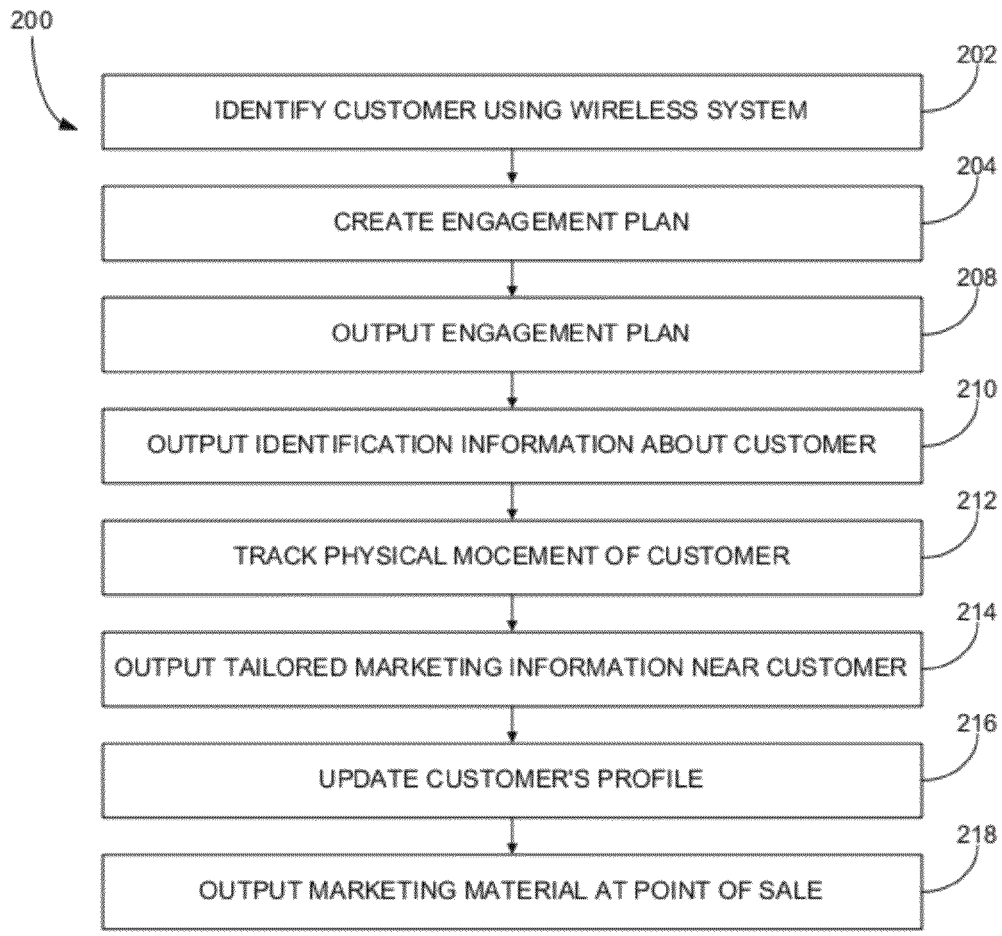
FIG. 2 is a flow diagram of a process for outputting information about a customer.

FIG. 2 illustrates a process 200 for outputting information about a customer using a wireless system such as the system shown in FIG. 1. In operation 202, the customer is identified utilizing a wireless system. Preferably, the customer is identified at an entrance to a defined area such as the interior of a structure, where the engagement plan is output within a predetermined amount of time from the identification of the customer to allow, for example, a sales associate or service provider to exploit the window of time from when the customer enters a store until the customer checks out. Additionally, the customer can be identified at a predetermined location, such as in a particular department.

In operation 204, an engagement plan is created based on the profile (of the customer) associated with the identification of the customer. The engagement plan has information useful for interacting with the customer. Such information can be aimed at a service provider or retailer and can include suggestions, strategies, explicit instructions, etc. The engagement plan can also include other types of useful information, including a preference of the customer such as favorite salesperson or waiter, favorite food item or type of product, preferred seat, etc. The engagement plan may also include a preferred engagement level, i.e., brief to extended. Information for cross-selling can also be included. Additionally, incentives such as coupons, rebates, loyalty rewards, etc. can accompany/be included in the engagement plan.

The engagement plan also entails marketing and promotions output directly to the user. More discussion regarding this feature is provided below.

The engagement plan is preferably created based at least in part on personal information of the customer. Personal information refers to any type of information associated with that customer alone, such as a profile, name, transaction history, preferences, account number, user identification number, etc. The engagement plan may also be tailored based at least partially on input relating to a prior interactions of the customer with one or more of a website, a physical location such as a store, a catalog transaction (catalog sale or request for information), and a telesales interaction. An interaction occurs, for example, when the customer in some manner views, discusses, searches for, and/or requests an item or service in one of the contexts set forth above.

Additionally, the driving software can be implemented with other applications, such as debit/credit card, e-purse, private payment, e-couponing and more, bringing additional benefits and convenience for customers.

To effectively engage those customers who look online or in magazines prior to purchasing a product or service, the engagement plan may also include a description of the item or service that the customer looked at or discussed online, in a store, on the phone with a catalog or teleservice representative, etc. For example, the user would be identified during a browsing session using a cookie and the items viewed during that session would be logged for later integration into an engagement plan.

Preferably, a status of the customer is determined on a tiered scale. This identifies the customer on a tier such as an occasional customer, a general customer, a preferred customer, a top 5% customer, etc., and the customer's position on the tier can be based on prior transaction/purchase history, past sales, etc. The engagement plan may then be created based at least in part on the status of the customer.

For example, the status of a customer can be specified on a tiered scale: Platinum, Gold, Silver, Bronze etc. This may be determined both on the revenues generated by virtue of purchases made by the customer, and also by costs incurred in servicing the customer. There could be various types of costs incurred in servicing a customer. Some examples are: post-sales customer service over the telephone, post-sales customer service over email, post-sales customer self-service by using the web-site, costs associated with products returned by the customer. The industry figures for post-sales customer-service are: Telephone—$12 per call; Email—$4 per email which is responded to; Web-based self-service—4 cents The engagement plan is output in operation 208. In operation 210, identification information about the customer is output to assist a user in identifying the customer. Exemplary identification information includes a visual likeness of the customer. Other identification information may include a probable location of the customer. This information can be determined, for example, based on statistics of departments and/or sales items in which the customer has shown interest in the past. Additionally, past transaction data can be mined in order to determine the most likely location of the customer.

In operation 212, physical movement, i.e., geographical or positional movement, of the customer is tracked utilizing the wireless system. This data reflects which items the customer looked at most, which department she spent the most time in, etc. This in turn helps optimize product placement and promotion.

Tracking data can also be used to help a user find the customer, such as by outputting an indicator of a physical location of the customer. The personal information of the customer can be updated based on the physical movement of the customer.

For tailored marketing, product information and/or pricing can be selected based at least in part on the personal information of the customer and/or the physical location of the customer, and output near the customer, i.e., within the customer's range of sight and/or hearing. Note operation 214. The output can be visual, auditory, physical (paper coupon), etc. Similarly, special product or service pricing can be selected based at least in part on the personal information of the customer, and output near the customer. Illustrative output devices for such tailored marketing include networked screens, portable devices, speaker systems, kiosks, etc.

Kiosks can also identify a customer and provide tailored output to particular customers, allowing them to shop an expanded product assortment, use registries, and get in-depth product information for in-store research.

To tailor a sales pitch to an undecided customer, or offer assistance or a promotion for a product the customer has shown interest in, a correlation can be made between the customer and products transported by the customer using the wireless system. This can be accomplished using positional sensing of RFID tags on products being in about the same position as the customer, sensing movement of a product while the customer is nearby, etc.

While the invention provides significant value in identifying and servicing a customer, there are scenarios when the value is further enhanced. One such scenario is when every item is tagged with a RFID Tag. In this scenario the Brick and Mortar Session could capture events such as products viewed by a customer and products tried by the customer. The Products Viewed Event would be based on the proximity of the person to a product; The Product Tried/Evaluated would be based, for example, on the product being transported by a customer to a changing room in a Retail Store. The executive dashboard could then show valuable metrics such as which products are being tried but not being purchased. This could indicate that the price is too high.

Whether the correlation takes place can be determined based on the physical position of the customer and product, such as in a changing room. The correlation can also be made upon the user physically moving the product a predefined distance, such as more than three feet from its original position, etc.

The wireless system may also correlate the customer with products potentially viewed by the customer for future reference into the interests of the customer. For example, products near stopping points of the customer as he passes through a store may be considered of general interest to the customer. These products can be identified and logged, and listed on a later engagement plan as a potential sell.

As an option, an alert can be activated upon expiration of a predetermined amount of time to instruct a user to check a service level of the customer to ensure that the customer is being serviced properly.

In operation 216, the customer's personal profile is updated based on information received during the session. For example, feedback can be obtained directly from the customer and stored for use in creating a future engagement plan. Information can also be received directly from a user that has interacted with the customer, and stored for use in creating a future engagement plan.

Towards the end of the session, an incentive (coupon, rebate, etc.) can be output to the customer at the POS with an amount due by the customer for services, products, etc. See operation 218. The system may also be integrated with a self-checkout system.

Figure 3:
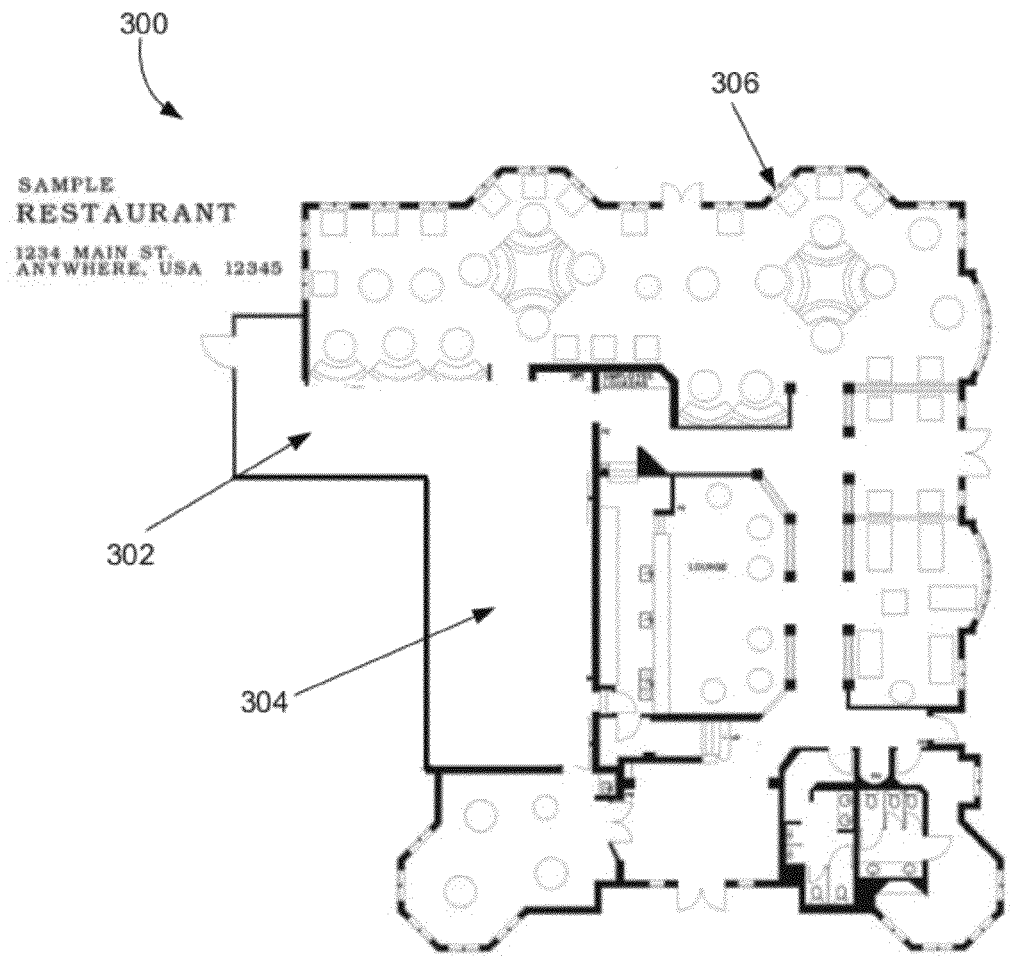
FIG. 3 depicts an illustrative restaurant setting for deployment of a CRM system.

FIG. 3 depicts an illustrative restaurant setting 300. At the entrance 302, an RF floor antenna senses the entrance of a preferred customer. This triggers a StartSession event. At 304, the manager is notified of the customer's preferred status and seating preference. This data is stored locally. The customer is seated per his or her preferred seating profile: window and corner (306).

The manager receives an engagement plan from the central CRM system. The plan includes:
current incentives and redemption
waiters who have served the customer previously
wine and main course preferences
special dietary requirements The manager briefs the selected waiter with the engagement plan. The waiter in turn appraises the customer of incentives, preferably prior to taking the customer's order. After a predetermined amount of time (generated based on prior history) has elapsed since the start of the session, the manager is alerted to check if the preferred customer is being serviced properly.

Towards the end of the session, the CRM interfaces with the POS to determine if the customer qualifies for new incentives and, if so, prints them on the check. The waiter in turn notifies the customer of the incentives. As the customer leaves, the manager wishes the customer goodbye and obtains overall feedback on the food and service, which the manager enters into the CRM system. The manager may also award a Preferred Customer card if the CRM determines that the customer qualifies for Preferred Status based on POS data.

When an RF floor antenna senses the customer leaving, an EndSession event is triggered. The manager and serving waiter provide updates for the next engagement plan. The session information and updates are sent to the central CRM.

FIG. 4 depicts an illustrative restaurant engagement plan 400. As shown, a customer information section 402 is provided, including name, tiered status, a preferred level of service, and the speed at which the customer typically dines.

A memoranda section 404 contains a list of notes input by waiters/managers who have interfaced with the customer. A food preferences section 406 lists items the customer has previously ordered, and how he likes them cooked and any special dietary concerns. A beverage preferences section 408 lists the customer's preferred beverages.

Figure 5:
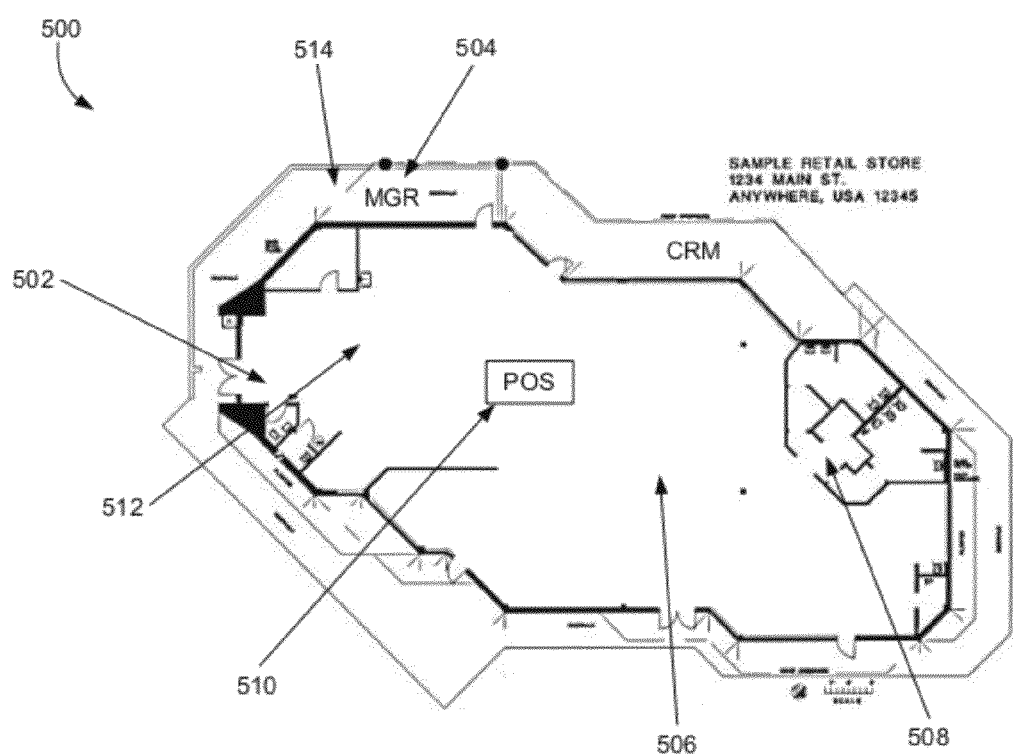
FIG. 5 depicts an illustrative retail setting for deployment of a CRM system.

FIG. 5 depicts an illustrative retail setting 500. One embodiment of the present invention for retail deployment provides the following features:
Enables customer identification at the store level when the customer walks into the store
Synchronizes information with the corporate CRM system to get "holistic-view" of the customer
Alerts store manager with customer's loyalty rating
Alerts store manager with possible cross-sells/up-sells for the customer
Disseminates this information to the sales clerk servicing the customer
Uses a cookie to manage a customer session at a store in a similar manner as a software cookie is used to start and manage an eCommerce session on the Web The system for retail deployment can be based on RFID Technology and a Real-Time Event-Driven Platform. RFID tags are put on a credit card carried by the customer.

RFID Readers are installed at the Store Entrance. This may require no additional investment if readers are already installed for theft prevention. These Readers enable the system to identify and initiate a start and end of a customer in-store session.

As an option, RFID Tags can also be installed on garments at the time of sale. When the POS-Clerk removes the anti-theft RF Transponder, a small RF Tag is installed on the garment (Note: RF Tags can be manufactured such that they are not affected by laundry; Sokymat has already demonstrated this for RF laundry applications). The RF tag is associated with a cookie that stores an association of the RF tag on a garment with the customer. When the customer re-enters the store wearing the garment, the cookie is used to indicate to personnel that the customer is wearing a garment purchased from that company.

With reference to FIG. 5, at the entrance 502, RF floor antenna senses entry of a preferred customer. Software at the store level reads the tag and generates a StartSession event. Session information can be stored at the store level and/or at the corporate level. Preferably, most of the session information is generated and stored at the local/store level to ensure fast operation. Where information is generated and stored may be altered depending on specific environments, performance considerations and implementation details.

The StartSession event starts a new customer in-store session. Software at the corporate level reads the event and interfaces with the back-end CRM system to obtain a customer profile.

At 504, the manager is notified of the presence of the preferred customer and an engagement plan is output from a central CRM system. The engagement plan can include:
  customer's loyalty rating
  sales representatives who have serviced the customer before
  memos from prior sales representatives
  list of cross-sells
  most likely departments to locate customer
  desired engagement level: brief to extended
  multi-channel aspects, such as prior interaction with a website, telesales, catalog transaction, etc.

The manager pages sales representatives who have been trained to handle preferred customers and briefs them with the engagement plan. The sales representative internalizes the engagement plan and prints the cross-sells list.

The sales representative tracks the customer to 506 based on departments in the engagement plan and engages with the customer per the plan. The sales representative may also hand over the cross-sells print out and highlight any cross-sells which may be on sale. The sales representative also gets feedback on the usefulness of cross-sells for this particular customer, which is then entered into the CRM system.

RFID Readers are also preferably placed at strategic locations in the store, such as the entrance to the changing room 508. When the customer walks past a strategic location, such as the changing room, instructions based on the customer profile are displayed on the sales-clerk's monitor at that location. An audio message can also be sent to the sales clerk. This is where the sales clerk can co-relate a customer's information with the customer and interface with the customer based on the customer's profile. These readers enable the intermediate transactions of a customer in-store session. RF antennas at the changing rooms provide events to the CRM system which enable tracking of frequency and duration of trips to the changing room.

RFID Readers are also preferably installed where the customers queue up—they are installed at the head of the queue, just before the POS. This Reader performs the last transaction of a customer in-store session. Here the POS-clerk can give a customer a cross-sell print, if the customer has not yet received it before.

When the customer proceeds to the POS at 510, the CRM interfaces with the POS to determine if the customer qualifies for new incentives, and prints it on the customer's bill. The POS reader instructs the POS clerk to give cross-sell print-out to customer. This instruction is given based on a set of rules encoded in the software. The cross-sell print-out not only contains the SKU's of the cross-sells, but could also have the size information. The POS clerk also notifies the customer of any new incentives. The customer may continue the session by asking a sales clerk to assist the customer in getting one or more of the cross-sells, promotional items, etc.

At the exit (512), the RF floor antenna senses the customer leaving, which in turn triggers an EndSession event. At 514, a sales clerk provides updates for the engagement plan. The session information and updates can be sent to a central CRM. Where final session information is stored may be altered depending on specific environments, performance considerations and implementation details.

Illustrative session information can include data for several analytics. Some examples are:
  Average time a customer spends at a store
  Average time a customer spends at a store based on different customer loyalties
  Time of the day when the largest number of loyal customers visit a store
  Which stores see the largest number of loyal customers If the customer does not have a card with an RFID tag or does not have preferred status, the CRM receives the POS data and determines if the customer qualifies for the tag and/or preferred status.

In another embodiment, a tag is attached to an item. For example, when a customer purchases a merchandise item, the POS-clerk installs an RF Tag, on the garment. This cookie has a unique ID, which can be associated with a cookie. When the customer wearing a tagged garment walks in, the system works in a similar way as it did with a customer with a tagged card.

FIG. 6A depicts an illustrative engagement plan 600 for a service provider. As shown, a customer information section 602 is provided, including name, tiered status, a preferred level of service, and the speed at which the customer typically shops. A memoranda section 604 contains a list of notes input by users who have interfaced with the customer.

Figure 6B:

FIG. 6B depicts an illustrative engagement plan 610 for a customer. A product preferences section 612 lists suggested products, including product details such as size, color, department, and whether the item is a past purchase or a suggested cross-sell. A gifts section 614 lists recommended gifts.

Use Cases

Following are several exemplary "Use Cases" which provide generic descriptions of the overall functionality of the CRM system of the present invention. The Use Cases are used to describe the interactions between the classes of the software system and the actors. A scenario is one particular set of interactions between use-cases and actors. Actors are the system components or humans that perform certain tasks.

In the following paragraphs, the relationship of actors and Use Cases for restaurant and retail solutions will be described. Each Use Case diagram includes the description and the actors. The Use Case title is the specific task actors will perform when the actors send a particular stimulus to the system. The following 5 scenarios have been modeled:

1. Send Reward Card to VIP Customers by mail
2. Award VIP Customer Status at POS
3. Identify a returning customer who has a bmRewards Card
4. Engage with the returning customer who has a bmRewards Card
5. Close a bmSession of a returning customer Scenario 1: Send Reward Card to VIP Customers by Mail
Actors

| Actor: Campaign Manager | Type of Actor: User |
|---|---|
| Actor: VIP Database/Corp CRM System | Type of Actor: External System |
| Actor: Reward Card Printing System | Type of Actor: External System |
| Actor: Retailer Reward Card Mailing Sys. | Type of Actor: External System |

Scenario Description

Figure 7:
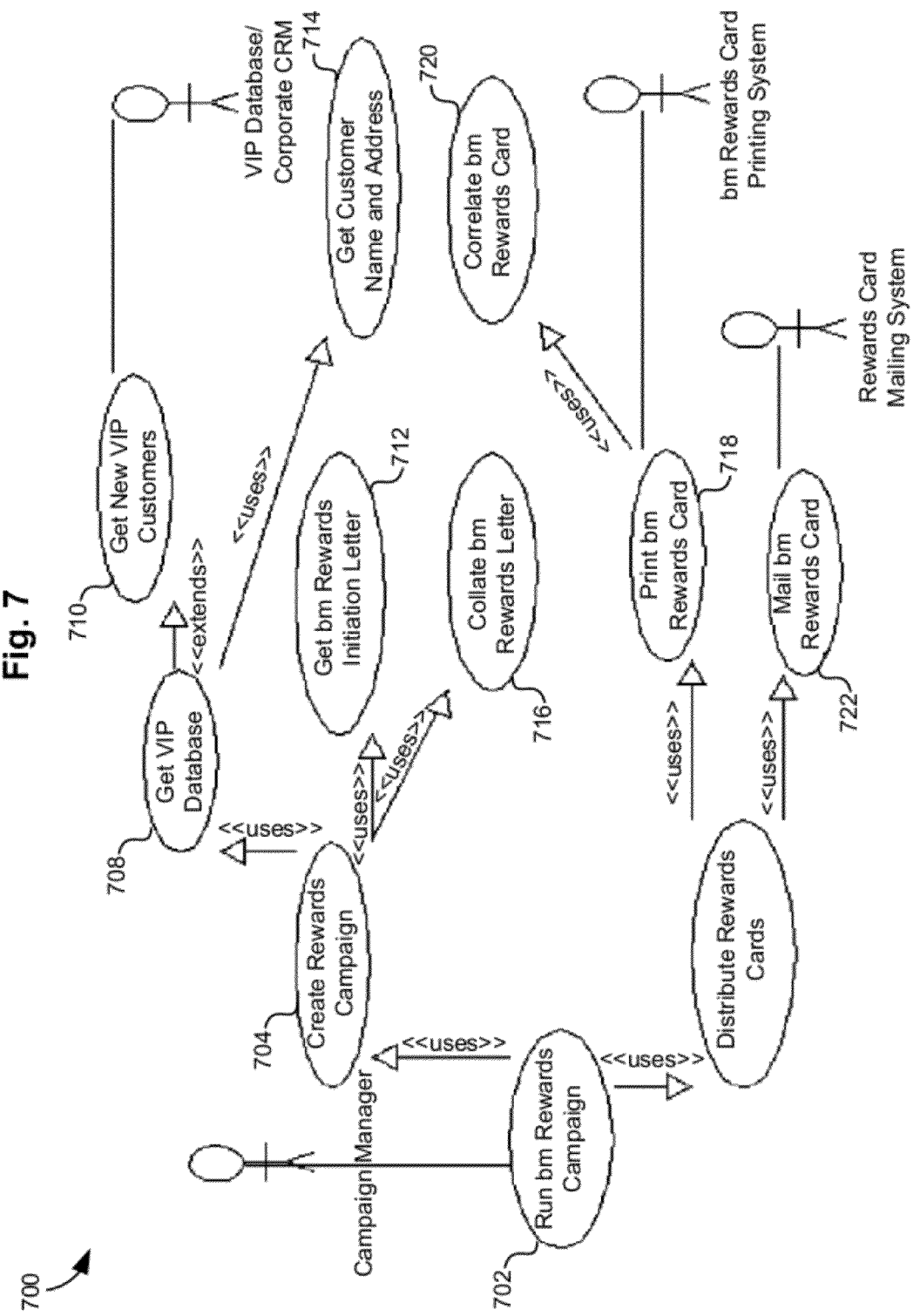
FIG. 7 is a flow diagram of a scenario for sending a reward card to a customer by mail.

This scenario starts when a Marketing campaign manager initiates the "Run Rewards Campaign" use case. The intermediate steps of the scenario are detailed in the description below and in FIG. 7, which is a flow diagram of the Use-Case 700 for sending a reward card to a VIP customer by mail. The scenario ends with the printing and mailing of Reward Cards.

Use Case Titles and Description

Title 702: Run bmRewards Campaign—This Use Case comprises the two main use cases in this scenario: the "Create Rewards Campaign" use case and the "Distribute Rewards Card" use case.

Title 704: Create Rewards Campaign—This Use Case includes all the steps required for determining the distribution list and creating the campaign letters.

Title 708: Get VIP List—This Use Case interfaces with the VIP Database and/or the Corporate CRM system.

Title 710: Get New VIP Customers—This Use Case only returns VIP customers who have not received a bmRewards Card before.

Title 712: Get bmRewards Initiation Letter—This Use Case receives the text of the letter, which the new VIP customers will receive.

Title 714: Get Customer Name and Address—This Use Case returns the mailing address of the VIP Customers.

Title 716: Collate bmRewards Letter—This Use Case collates the VIP customers with the text of the bmRewards Initiation letter and creates one letter per customer.

Title 718: Print bmRewards Card—This Use Case receives the Customer Names and interfaces with the bmReward Print System.

Title 720: Correlate bmRewards Card—This Use Case correlates the RFID tag information on the card with the Customer Information.

Title 722: Mail bmRewards Card—This Use Case sends a message to the Retailer Rewards Mailing System stating that the bmRewards Card and the letters are ready for mailing.

Scenario 2: Award VIP Customer Status at POS

Actors

| Actor: POS Clerk | Type of Actor: User |
|---|---|
| Actor: New Customer | Type of Actor: User |
| Actor: POS System | Type of Actor: External System |
| Actor: VIP Database/Corporate CRM | Type of Actor: External System |

Scenario Description

Figure 8:
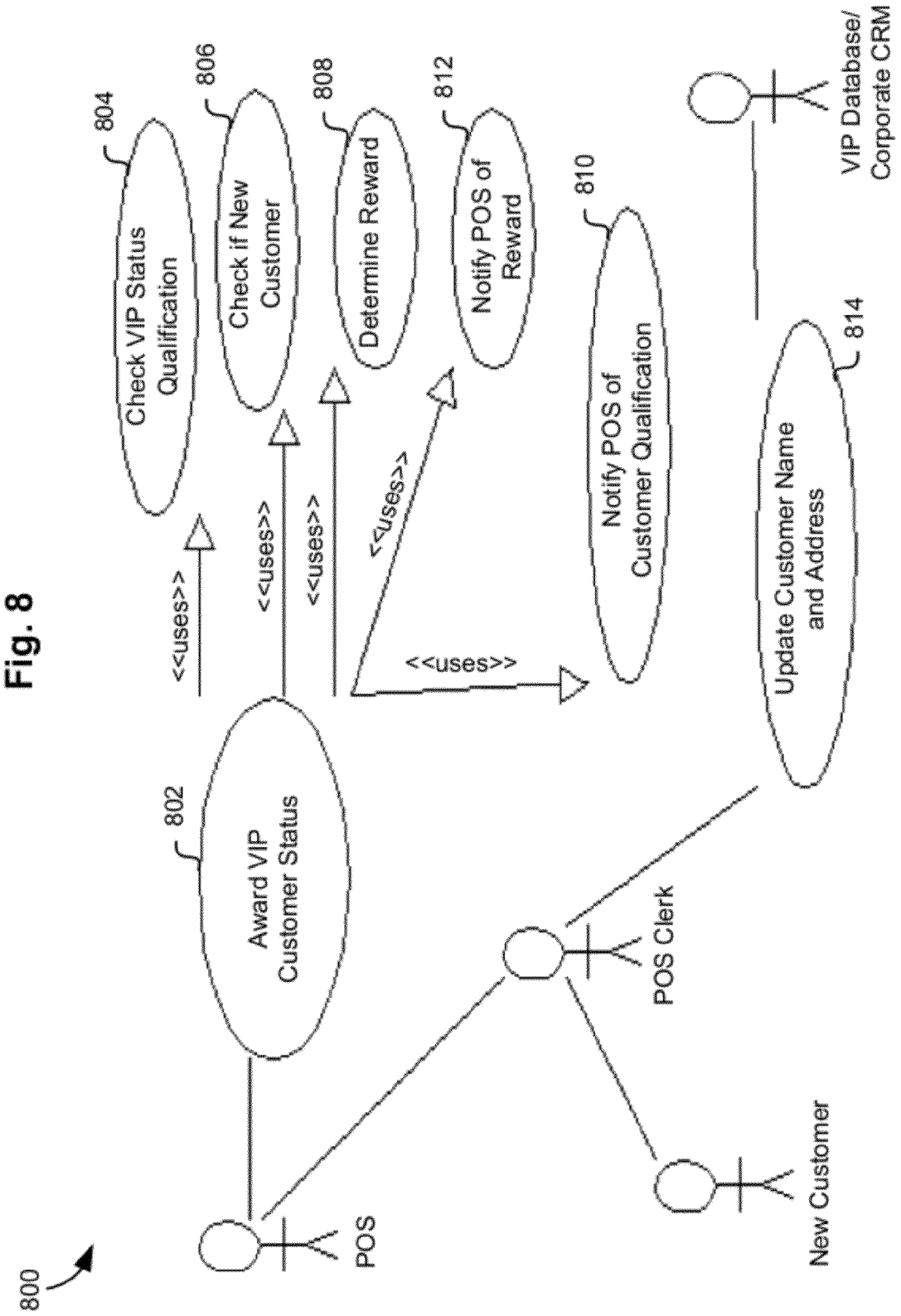
FIG. 8 is a flowchart of a scenario for awarding VIP customer status at the POS.

FIG. 8 is a flowchart of a scenario 800 for awarding VIP customer status at the POS. This scenario starts when the POS system sends the purchase information of a user to the "Award bmRewards Card" module. The intermediate steps of the scenario are detailed in the description below and in the scenario diagram. The scenario ends with the POS clerk awarding a VIP customer status to the new customer. The POS clerk provides a hand-out explaining how the bmRewards card works and that a bmRewards Card will be sent by mail.

Use Case Titles and Descriptions

Title 802: Award VIP Customer Status—This Use Case gets the purchase information of a customer from the POS in real-time. It calls the "Check VIP-Status Qualification" use case.

Title 804: Check VIP-Status Qualification—This Use Case checks whether the customer qualifies for a VIP or preferred Status Title 806: Check if New Customer—This Use Case checks if the customer is not already a VIP customer Title 808: Determine Reward—If the new customer qualifies for a VIP status, then this Use Case determines the reward to be given in order to incentivize the customer to return. Please note, the reward could be a service-based reward, for example it could be something like a free make-up (Stores like Sephora provide such incentives).

Title 810: Notify POS Clerk of Customer Qualification for VIP status—This Use Case sends a message to the monitor of the POS clerk notifying her that the new customer qualifies for a VIP status.

Title 812: Notify POS Clerk of Reward—This Use Case sends a message to the monitor of the POS clerk notifying her of the reward the customer has received. The POS clerk can convey this verbally to the customer, stating that the given reward will be documented in the letter Title 814: Update Customer Name and Address—If the customer accepts the VIP status then the POS clerk gets the customer's name and mailing address and updates this information.

Title (not shown): Send Customer Update to Corporate CRM—This Use Case sends the customer information to the corporate CRM/corporate VIP customer database.

Scenario 3: Start bmSession with a Returning Customer

Actors

| Actor: VIP Customer | Type of Actor: User |
|---|---|
| Actor: Manager | Type of Actor: User |
| Actor: RF Readers | Type of Actor: External System |
| Actor: RF Adapter | Type of Actor: External System |
| Actor: VIP Database/Corporate CRM | Type of Actor: External System |
| Actor: Printer | Type of Actor: External System |

Scenario Description

Figure 9:
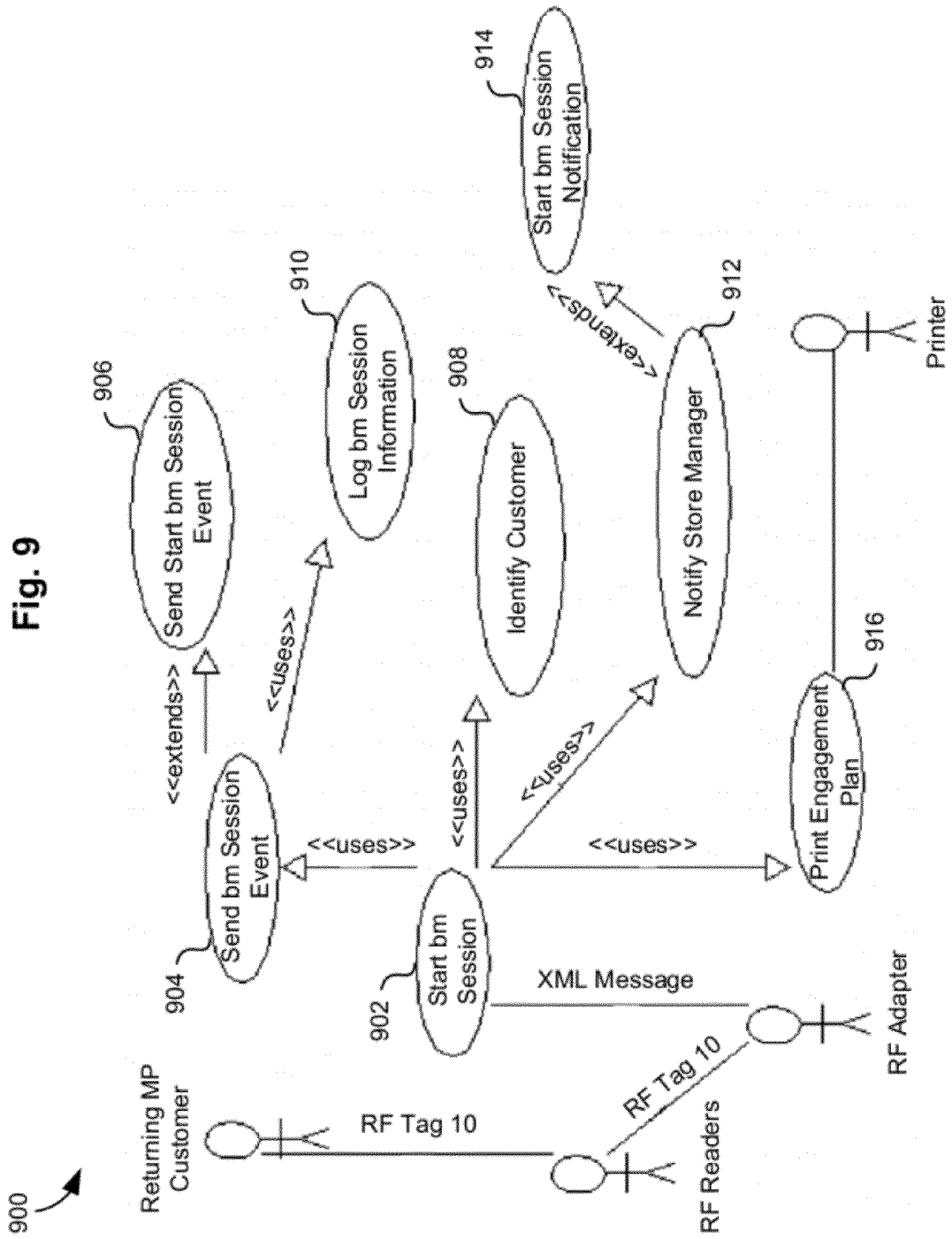
FIG. 9 is a flowchart of a scenario for starting a session with a returning customer.

FIG. 9 is a flowchart of a scenario 900 for starting a session with a returning customer. This scenario starts when a VIP Customer returns to the store. The RF Reader sends the sensed RF Tag information to the bmIdentification module. The scenario ends with the store manager being notified of the returning VIP customer and an engagement plan being printed for the manager.

Use Case Titles and Descriptions

Title 902: Start bmSession—This Use Case handles the start of a bmSession for the customer. It extends the Handle bmSession Use Case, which is the generic use case when any bmSession event occurs.

Title 904: Send bmSession Event—This Use Case sends the bmSession event to the subscribers of the event.

Title 906: Send Start bmSession Event—This Use extends the bmSession event by sending the Start Event.

Title 908: Identify Customer—This Use Case uses the RFID signature to identify the customer.

Title 910: Log bmSession Information—This Use Case logs the bmSession Information.

Title 912: Notify Store Manager—This Use Case notifies the store manager of a bmSession event.

Title 914: Start bmSession Notification—This Use Case extends the Notify Store Manager Use case by notifying the store manager of the start bmSession event.

Title 916: Print bmEngagement Plan—This Use Case prints the engagement plan for the manager. Note, the engagement plan contains the preferred sales rep for the customer. The manager can then page the sales rep, which starts off the next use case scenario.

Scenario 4: Engage with a Returning VIP Customer
Actors

| Actor: VIP Customer | Type of Actor: User |
| --- | --- |
| Actor: Manager | Type of Actor: User |
| Actor: RF Readers | Type of Actor: External System |
| Actor: RF Adapter | Type of Actor: External System |
| Actor: VIP Database/Corporate CRM | Type of Actor: External System |
| Actor: Printer | Type of Actor: External System |

Scenario Description

Figure 10:
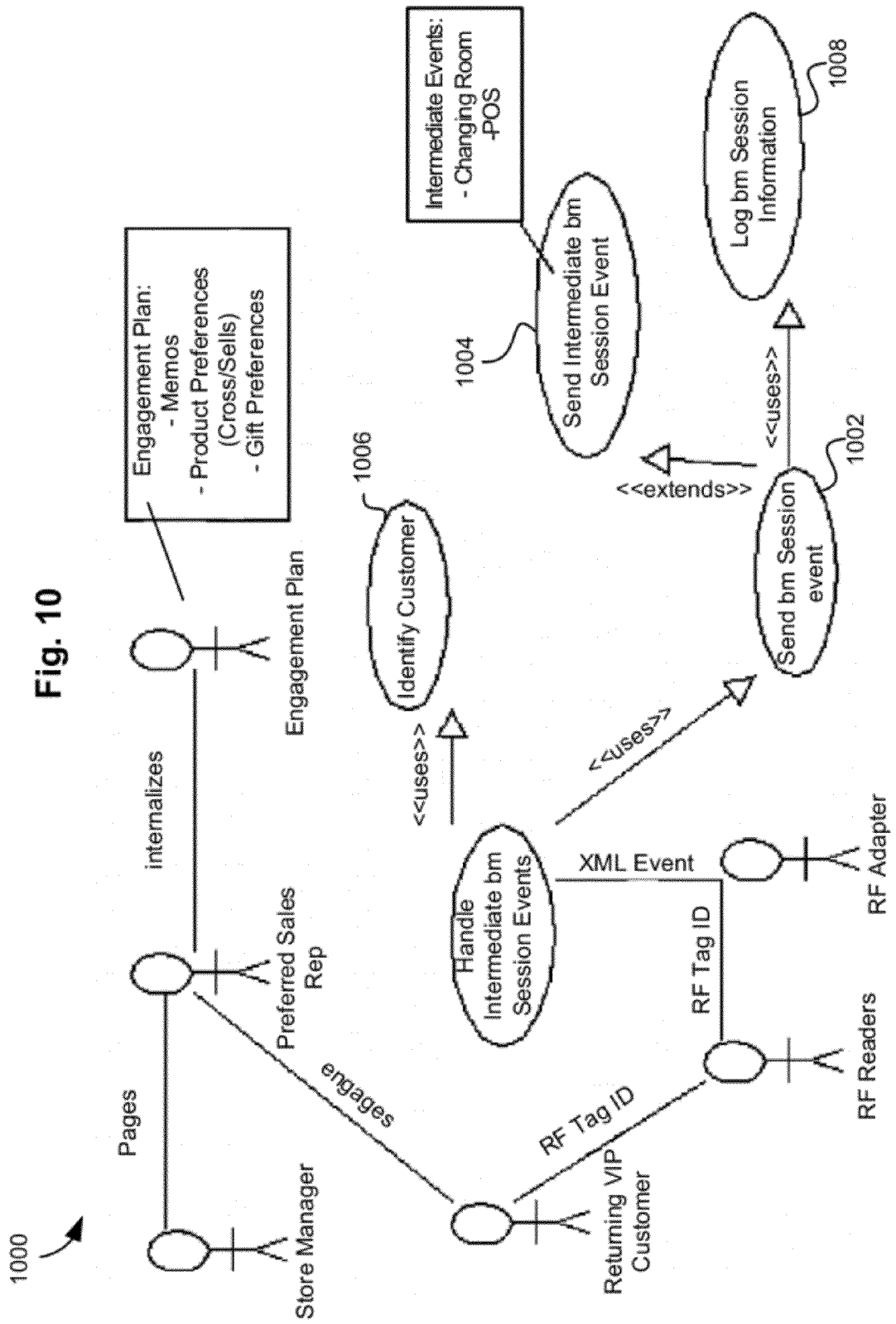
FIG. 10 is a flowchart of a scenario for engaging a return customer.

FIG. 10 is a flowchart of a scenario 1000 for engaging a return customer. This scenario starts when the Manager is notified of a VIP customer entering the store—the manager also has the engagement plan for the preferred customer. The manager obtains the preferred sales rep information from the engagement plan and pages the sales rep. The sales rep internalizes the engagement plan. The sales rep then engages with the customer. This scenario also captures intermediate session information, such as the customer entering and exiting a changing room, entering and leaving a department, and completing a purchase at the POS.

Use Case Titles and Descriptions

Title 1002: Send bmSession Event—This Use Case sends the bmSession event to the subscribers of the event.

Title 1004: Send Intermediate bmSession Event—This Use extends the bmSession event by sending intermediate session events such as entering and exiting changing rooms, entering and exiting departments etc.

Title 1006: Identify Customer—This Use Case uses the RFID signature to identify the customer.

Title 1008: Log bmSession Information—This Use Case logs the bmSession Information.

Scenario 5: Close a bmSession of a Returning Customer
Actors

| Actor: VIP Customer | Type of Actor: User |
| --- | --- |
| Actor: Manager | Type of Actor: User |
| Actor: RF Readers | Type of Actor: External System |
| Actor: RF Adapter | Type of Actor: External System |
| Actor: VIP Database/Corporate CRM | Type of Actor: External System |
| Actor: Printer | Type of Actor: External System |

Scenario Description

Figure 11:
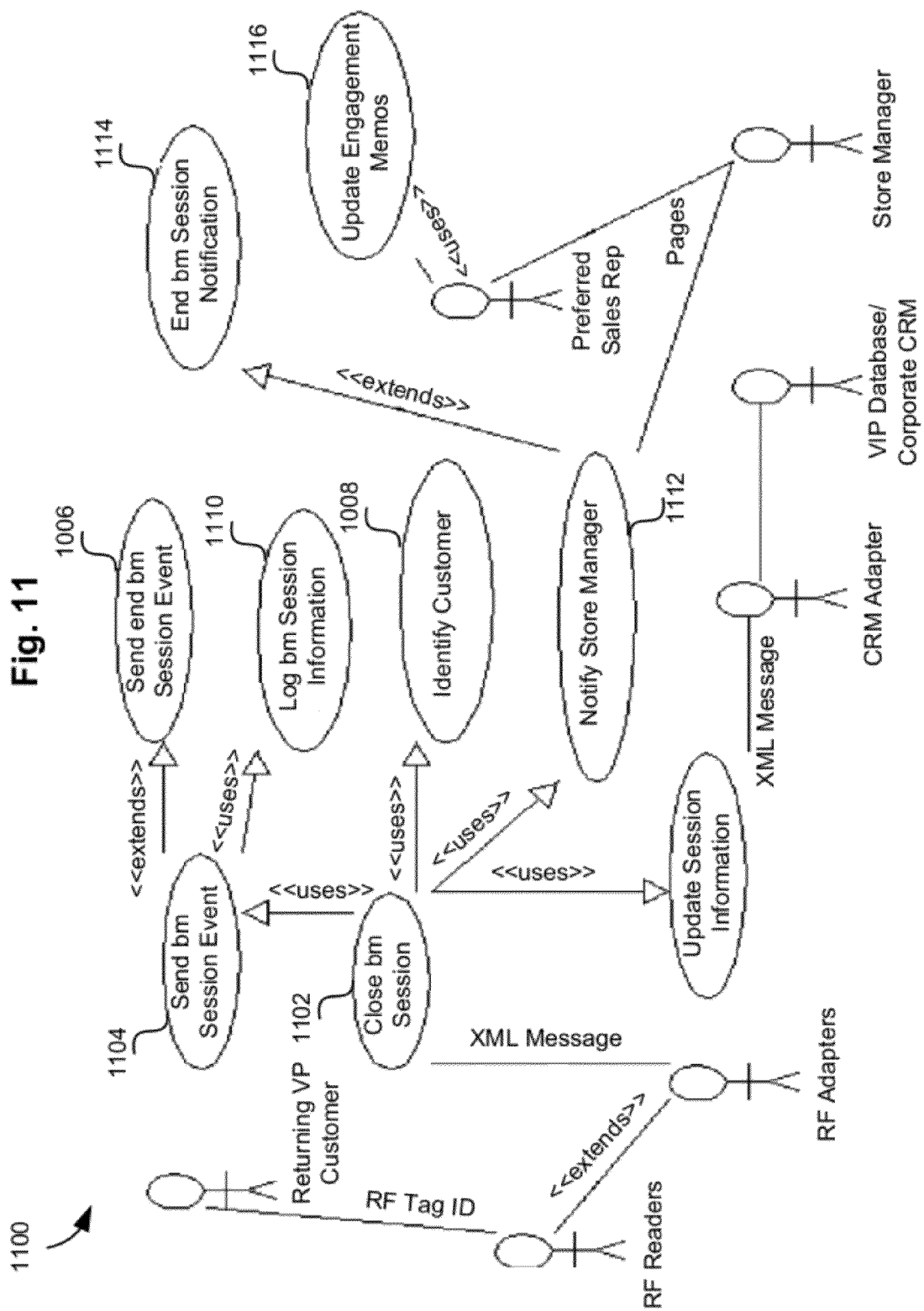
FIG. 11 is a flowchart of a scenario for closing a session.

FIG. 11 is a flowchart of a scenario 1100 for closing a session. This scenario starts when a VIP Customer leaves the store. The RF Reader sends the sensed RF Tag information to the bmIdentification module. The store manager is notified of the customer leaving. The scenario ends with the sales representative updating the data for the engagement plan of the customer.

Use Case Titles and Descriptions

Title 1102: Close bmSession—This Use Case handles the closure of a bmSession for the customer. It extends the Handle bmSession Use Case, which is the generic use case when any bmSession event occurs.

Title 1104: Send bmSession Event—This Use Case sends the bmSession event to the subscribers of the event.

Title 1106: Send End bmSession Event—This Use extends the bmSession event by sending the End Event.

Title 1108: Identify Customer—This Use Case uses the RFID signature to identify the customer.

Title 1110: Log bmSession Information—This Use Case logs the bmSession Information.

Title 1112: Notify Store Manager—This Use Case notifies the store manager of a bmSession event.

Title 1114: End bmSession Notification—This Use Case extends the Notify Store Manager Use case by notifying the store manager of the end bmSession event.

Title 1116: Update Engagement Memos—This Use Case is used by the Sales Representative to add engagement information pertaining to the last interaction.

Architecture

According to one embodiment, a TomCat WebServer with its Servlet Engine can be used. The overarching architectural follows the MVC paradigm where the Model, View and Controller are separated in an n-tier architecture.

If the deployment calls for a distributed architecture then the MVC paradigm implemented using TomCat can easily be moved to an MVC paradigm using a J2EE server. Essentially, the difference is that the distributed components can be implemented as EJB's—the Entity EJB's would then be the "model."

JSP Architectural Paradigms

The early JSP specifications advocated two philosophical approaches, popularly known as Model 1 and Model 2 architectures, for applying JSP technology. These approaches differ essentially in the location at which the bulk of the request processing was performed, and offer a useful paradigm for building applications using JSP technology.

Figure 12:
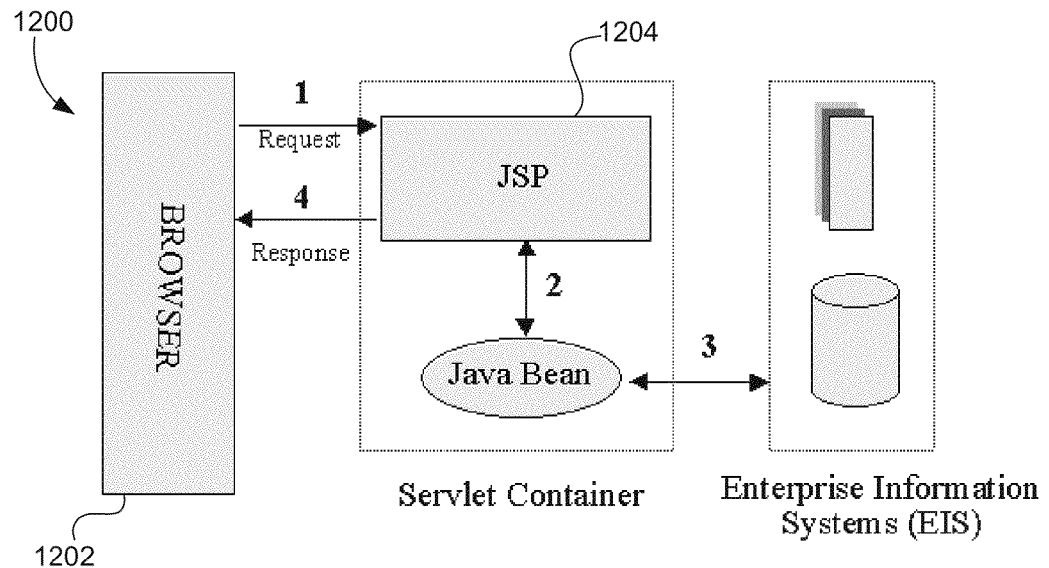
FIG. 12 is a system diagram of a wireless CRM system architecture according to one embodiment of the present invention.

Consider the Model 1 architecture 1200, shown in FIG. 12. In the Model 1 architecture, the incoming request from a web browser 1202 is sent directly to the JSP page 1204, which is responsible for processing it and replying back to the client. There is still separation of presentation from content, because all data access is performed using beans.

Although the Model 1 architecture is suitable for simple applications, it may not be desirable for complex implementations. Indiscriminate usage of this architecture usually leads to a significant amount of scriptlets or Java code embedded within the JSP page, especially if there is a significant amount of request processing to be performed. While this may not seem to be much of a problem for Java developers, it is certainly an issue if the JSP pages are created and maintained by designers—which is usually the norm on large projects. Another downside of this architecture is that each of the JSP pages must be individually responsible for managing application state and verifying authentication and security.

Figure 13:
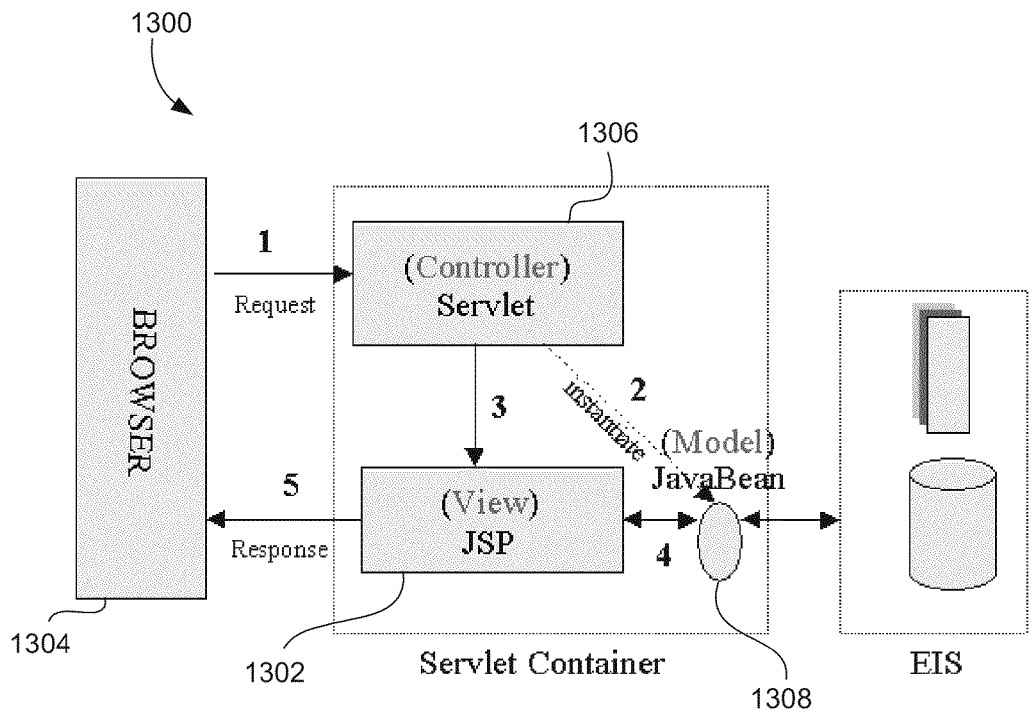
FIG. 13 is a system diagram of another wireless CRM system architecture according to one embodiment of the present invention.

The Model 2 architecture 1300, shown in FIG. 13, is a server-side implementation of the popular Model/View/Controller design pattern. Here, the processing is divided between presentation and front components. Presentation components 1302 are JSP pages that generate the HTML/XML response that determines the user interface when rendered by the browser 1304. Front components 1306 (also known as controllers) do not handle any presentation issues, but rather, process all the HTTP requests. Here, they are responsible for creating any beans 1308 or objects used by the presentation components, as well as deciding, depending on the user's actions, which presentation component to forward the request to. Front components can be implemented as either a servlet or JSP page.

The advantage of this architecture is that there is no processing logic within the presentation component itself; it is simply responsible for retrieving any objects or beans that may have been previously created by the controller, and extracting the dynamic content within for insertion within its static templates. Consequently, this clean separation of presentation from content leads to a clear delineation of the roles and responsibilities of the developers and page designers on the programming team. Another benefit of this approach is that the front components present a single point of entry into the application, thus making the management of application state, security, and presentation uniform and easier to maintain.

Figure 14:
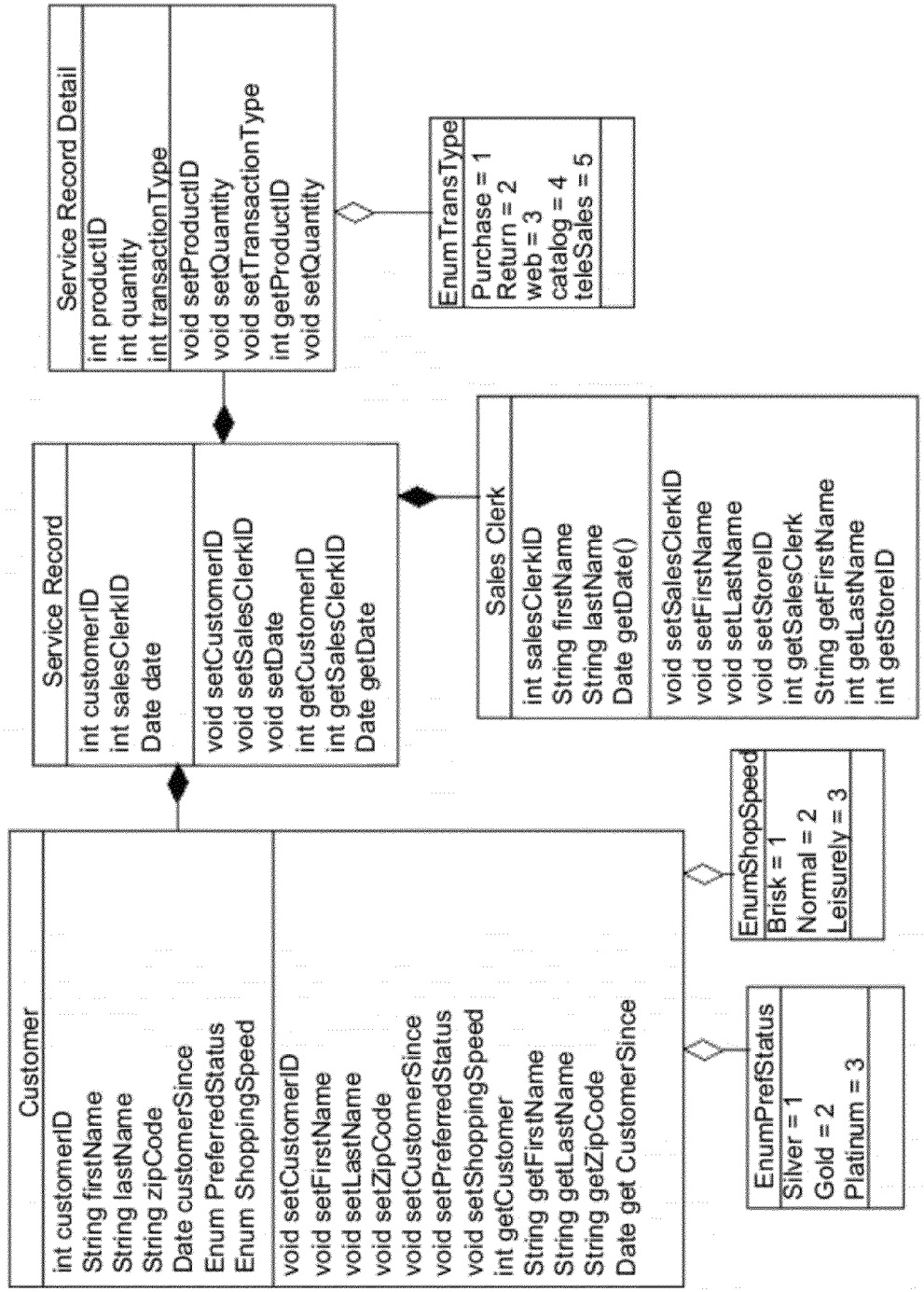
FIG. 14 is a class diagram showing exemplary classes pertaining to customer engagement.
Figure 15:
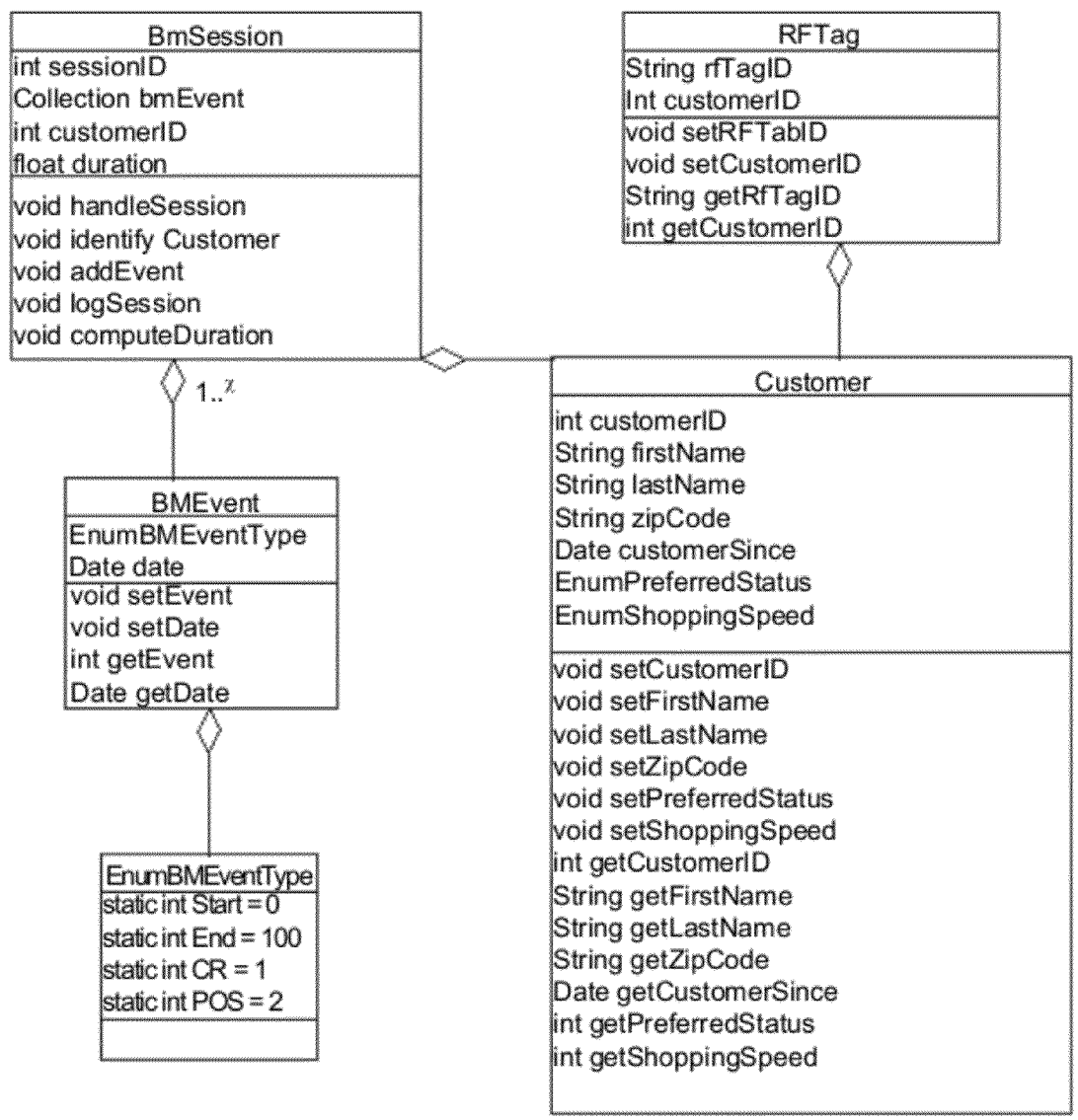
FIG. 15 is a class diagram depicting illustrative classes related to bmSessions.
Figure 16:
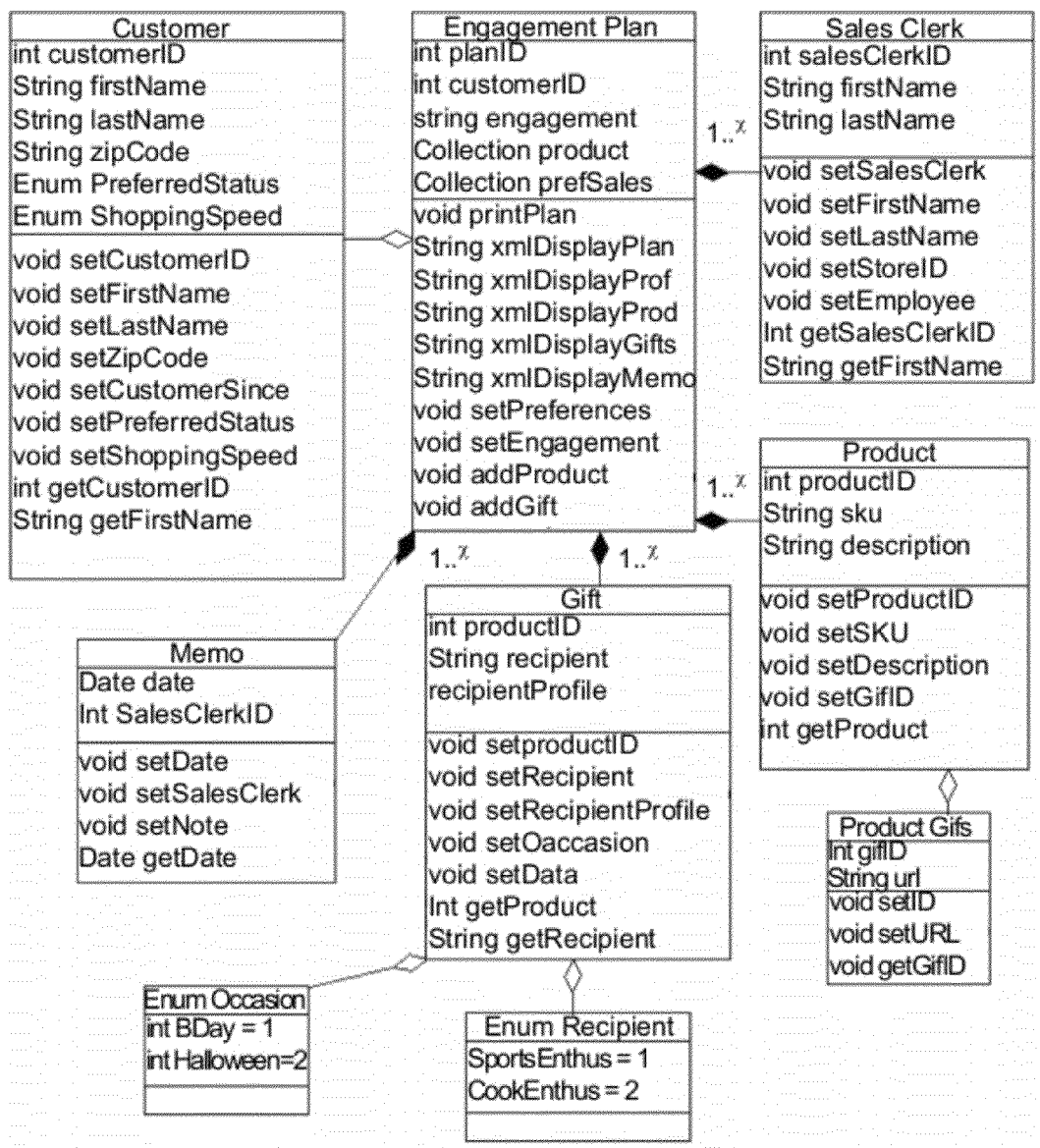
FIG. 16 is a class diagram illustrating exemplary classes related to an engagement plan.

FIG. 14 is a class diagram 1400 showing exemplary classes pertaining to customer engagement. FIG. 15 is a class diagram 1500 depicting illustrative classes related to bmSessions. FIG. 16 is a class diagram 1600 illustrating exemplary classes related to an engagement plan.

According to one embodiment, four databases are used: CRM, POS, Inventory, and IP. The CRM database contains tables relating to customer information and customer preferences based on prior transactions. The POS database contains tables relating to POS transactions. The Inventory database contains the products and product picture information. The IP database contains tables pertaining to core IP, such as BM Session Information, BM Memos etc.

Overview of RFID
Benefits of RFID

The significant advantage of all types of RFID systems is the noncontact, non-line-of-sight nature of the technology. Tags can be read through a variety of substances such as snow, fog, ice, paint, crusted grime, and other visually and environmentally challenging conditions, where barcodes or other optically read technologies would be useless. RFID tags can also be read in challenging circumstances at remarkable speeds, in most cases responding in less than 100 milliseconds. The read/write capability of an active RFID system is also a significant advantage in interactive applications such as work-in-process or maintenance tracking Though it is a costlier technology (compared with barcode), RFID has become indispensable for a wide range of automated data collection and identification applications that would not be possible otherwise.

RFID Technology Overview

A basic RFID system consist of three components:
An antenna or coil
A transceiver (with decoder)
A transponder (RF tag) electronically programmed with unique information The antenna emits radio signals to activate the tag and read and write data to it. Antennas are the conduits between the tag and the transceiver, which controls the system's data acquisition and communication. Antennas are available in a variety of shapes and sizes; they can be built into a door frame to receive tag data from persons or things passing through the door, or mounted on an interstate toll booth to monitor traffic passing by on a freeway. The electromagnetic field produced by an antenna can be constantly present when multiple tags are expected continually. If constant interrogation is not required, the field can be activated by a sensor device.

Often the antenna is packaged with the transceiver and decoder to become a reader (a.k.a. interrogator), which can be configured either as a handheld or a fixed-mount device. The reader emits radio waves in ranges of anywhere from one inch to 100 feet or more, depending upon its power output and the radio frequency used. When an RFID tag passes through the electromagnetic zone, it detects the reader's activation signal. The reader decodes the data encoded in the tag's integrated circuit (silicon chip) and the data is passed to the host computer for processing.

RFID Tags

RFID tags come in a wide variety of shapes and sizes. Animal tracking tags, inserted beneath the skin, can be as small as a pencil lead in diameter and one-half inch in length. Tags can be screw-shaped to identify trees or wooden items, or credit-card shaped for use in access applications. The antitheft hard plastic tags attached to merchandise in stores are RFID tags. In addition, heavy-duty 5-by 4-by 2-inch rectangular transponders used to track intermodal containers or heavy machinery, trucks, and railroad cars for maintenance and tracking applications are RFID tags.

RFID tags are categorized as either active or passive. Active RFID tags are powered by an internal battery and are typically read/write, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data would then become part of the tagged part's history. The battery-supplied power of an active tag generally gives it a longer read range. The trade off is greater size, greater cost, and a limited operational life (which may yield a maximum of 10 years, depending upon operating temperatures and battery type).

Passive RFID tags operate without a separate external power source and obtain operating power generated from the reader. Passive tags are consequently much lighter than active tags, less expensive, and offer a virtually unlimited operational lifetime. The trade off is that they have shorter read ranges than active tags and require a higher-powered reader. Read-only tags are typically passive and are programmed with a unique set of data (usually 32 to 128 bits) that cannot be modified. Read-only tags most often operate as a license plate into a database, in the same way as linear barcodes reference a database containing modifiable product-specific information.

RFID systems are also distinguished by their frequency ranges. Low-frequency (30 KHz to 500 KHz) systems have short reading ranges and lower system costs. They are most commonly used in security access, asset tracking, and animal identification applications. High-frequency (850 MHz to 950 MHz and 2.4 GHz to 2.5 GHz) systems, offering long read ranges (greater than 90 feet) and high reading speeds, are used for such applications as railroad car tracking and automated toll collection. However, the higher performance of high-frequency RFID systems incurs higher system costs.

Developments in RFID technology continue to yield larger memory capacities, wider reading ranges, and faster processing. It is highly unlikely that the technology will ultimately replace barcode—even with the inevitable reduction in raw materials coupled with economies of scale, the integrated circuit in an RF tag will never be as cost-effective as a barcode label. However, RFID will continue to grow in its established niches where barcode or other optical technologies are not effective. If some standards commonality is achieved—whereby RFID equipment from different manufacturers can be used interchangeably—the market will very likely grow exponentially.

Attributes of RFID Technology

Frequency

Three frequency ranges are generally distinguished for RFID systems, low, intermediate (medium) and high. The following table summarizes these three frequency ranges, along with the typical system characteristics and examples of major areas of application.

TABLE 1

Frequency Bands and Applications

| Frequency Band | Operating Principle | Characteristics | Typical Applications |
| --- | --- | --- | --- |
| Low 100-500 kHz | Magnetic Induction | Short to medium read range Inexpensive low reading speed | Access control Animal identification Inventory control |
| Intermediate 10-15 MHz | Magnetic Induction | Short to medium read range potentially inexpensive medium reading speed | Access control Smart cards |
| High 850-950 MHz 2.4-5.8 GHz | Electro-magnetic wave propagation | Long read range High reading speed Line of sight required Expensive | Railroad car monitoring Toll collection systems |

A degree of uniformity is being sought for carrier frequency usage, through three regulatory areas, Europe and Africa (Region 1), North and South America (Region 2) and Far East and Australia (Region 3). Each country manages their frequency allocations within the guidelines set out by the three regions. Unfortunately, there has been little or no consistency over time with the allocation of frequency, and so there are very few frequencies that are available on a global basis for the technology. This will change with time, as countries are required to try to achieve some uniformity by the year 2010.

Three carrier frequencies receiving early attention as representative of the low, intermediate and high ranges are 125 kHz, 13.56 MHz and 2.45 GHz. However, there are eight frequency bands in use around the world, for RFID applications. The applications using these frequency bands are listed in Table 2.

Not all of the countries in the world have access to all of the frequency bands listed above, as some countries have assigned these bands to other users. Within each country and within each frequency range there are specific regulations that govern the use of the frequency. These regulations may apply to power levels and interference as well as frequency tolerances.

TABLE 2

Frequency Bands and Applications

| Frequency range | Applications and comments |
| --- | --- |
| Less than 135 kHz | A wide range of products available to suit a range of applications, including animal tagging, access control and track and traceability. Transponder systems which operate in this band do not need to be licensed in many countries. |
| 1.95 MHz, 3.25 MHz, 4.75 MHz, and 8.2 MHz | Electronic article surveillance (EAS) systems used in retail stores |
| Approx. 13 MHz, 13.56 MHz | EAS systems and ISM (Industrial, Scientific and Medical) |
| Approx. 27 MHz | ISM applications |
| 430-460 MHz | ISM applications specifically in Region 1 |
| 902-916 MHz | ISM applications specifically in Region 2. In the USA this band is well organized with many different types of applications with different levels of priorities. This includes Railcar and Toll road applications. The band has been divided into narrow band sources and wide band (spread spectrum type) sources. In Region 1 the same frequencies are used by the GSM telephone network. |
| 918-926 MHz | RFID in Australia for transmitters with EIRP less than 1 watt |
| 2350-2450 MHz | A recognized ISM band in most parts of the world. IEEE 802.11 recognizes this band as acceptable for RF communications and both spread spectrum and narrow band systems are in use. |
| 5400-6800 MHz | This band is allocated for future use. The FCC have been requested to provide a spectrum allocation of 75 MHz in the 5.85-5.925 GHz band for Intelligent Transportation Services use. In France the TIS system is based on the proposed European pre-standard (preENV) for vehicle to roadside communications communicating with the roadside via microwave beacons operating at 5.8 GHz. |

Pros and Cons of Three Different Frequencies

<150 kHz (125 kHz & 134 kHz)

Advantages:
    Uses normal CMOS processing—basic and ubiquitous
    Relative freedom from regulatory limitations
    Well suited for applications requiring reading small amounts of data at slow speeds and minimal distances
    Penetrates materials well (water, tissue, wood, aluminum)

Disadvantages:
    Does not penetrate or transmit around metals (iron, steel)
    Handles only small amounts of data
    Slow read speeds
    Large Antennas—compared to higher frequencies Minimal Range
Tag construction:
is thicker (than 13.56 MHz)
is more expensive (than 13.56 MHz)
more complex (requires more turns of the induction coil)
13.56 MHz
Advantages
Uses normal CMOS processing—basic and ubiquitous
Well suited for applications requiring reading small amounts of data and minimal distances
Penetrates water/tissue well
Simpler antenna design (fewer turns of the coil); lower costs to build
Higher data rate (than 125 kHz—but slower than higher MHz systems)
Thinner tag construction (than 125 kHz)
Disadvantages
Government regulated frequency
(U.S. versus Europe)
Does not penetrate or transmit around metals
(unless very thick)
Large Antennas (compared to higher frequencies)
Larger tag size than higher frequencies
Tag construction: requires more than one surface to complete a circuit
Minimal Range
>400 MHz <1 GHz
Advantages
Effective around metals
Best available frequency for distances of >1 m
Tag size smaller than 13.56 MHz
Smaller antennas
Range: licensed to 20-40' with reasonable sized tag (stamp to eraser size)
Good non-line-of-sight communication (except for conductive, "lossy" materials)
High data rate; Large amounts of Data
Controlled read zone (through antenna directionality)
>400 MHz <1 GHz
Disadvantages
Does not penetrate water/tissue
Regulatory issues (not available in many countries)
Regulatory issues in Europe (similar band ~869 MHz requires dual-freq chip)
DSI III recommends 862 to 870 MHz in the EU, may not be available elsewhere
Range
The range that can be achieved in an RFID system is essentially determined by:
The power available at the reader/interrogator to communicate with the tag(s)
The power available within the tag to respond
The environmental conditions and structures, the former being more significant at higher frequencies including signal to noise ratio
The frequency
Although the level of available power is the primary determinant of range the manner and efficiency in which that power is deployed also influences the range. The field or wave delivered from an antenna extends into the space surrounding it and its strength diminishes with respect to distance. The antenna design will determine the shape of the field or propagation wave delivered, so that range will also be influenced by the angle subtended between the tag and antenna.

The impact of frequency on Range is tabulated below:

TABLE 3

Frequency Band and Range

| Frequency Band | Range |
|---|---|
| Low | Short to medium read range |
| 100-500 kHz | Inexpensive |
| | low reading speed |
| Intermediate | Short to medium read range |
| 10-15 MHz | potentially inexpensive |
| | medium reading speed |
| High | Long read range |
| 850-950 MHz | High reading speed |
| 2.4-5.8 GHz | Line of sight required |
| | Expensive |

Environmental Factors
RFID Characteristics and Effects of Environmental Factors
FIG. 17 is a table 1700 from http:www.omron.com/card/rfid/faq/004.htm listing characteristics of various types of RFID systems that can be used with embodiments of the present invention.
Environmental Electrical Noise
If there is environmental electrical noise (RFI) in the location of the Antenna system, some reduction in the read performance may result. This RFI could be caused by:
  a) Other transmitters in the location
  b) Inverters on drives and motors
  c) Electrical noise generated by moving equipment such as conveyors
  d) Noise associated with the power supply, especially Switched Mode Power
  Supplies.
Shielding the antenna is often an effective way to reduce or overcome such issues. This has benefits because it not only stops the RFI but it also stops any interference generated by the Reader affecting other equipment. The shield also stops transponders (XP), which are not in the read zone from being read. A shield also allows higher power levels to be used and still keep within the regulatory limits.
Preferred RFID Systems
Floor mounted systems are preferred because they do not pose any aesthetic restrictions for a BM establishment. In addition, since the RFID card will be carried primarily in wallets and purses their distance from the floor should not exceed 1 meter in most cases—1.5 meter read range should be more than adequate, and can be achieved by placing two 0.75 meter read range antennas at opposite sides of a doorway.
Passive Tags may be used to eliminate the need for customers to replace batteries on an active tag.
A long range contactless 13.56 MHz RF coupler can be used. The preferred long range coupler is designed to provide long distance communication between the host and a range of contactless chips, including INSIDE's PicoTag and any other ISO 15693 compliant product. Preferred general specifications of the coupler are:
  Operating frequency 13.56 MHz
  Operating temp°-20° C. to +70° C.
  Physical dimensions 150×160 mm
  Operating distance up to 150 cm (Depending on the type of transponder and antenna)
  Interfaces
  Host interfaces RS232/RS485
  Baud rate Default 9600 bps
  (up to 115.2K bps)
  Supported ISO 15693 contactless standards The Read/Write Antennas, such as the HS500-Series Read/Write Antennas, provide an interface between a Read/Write RFID Controller and the data in the HS-Series Read/Write Tags. The antennas can transfer data at about 3000 bytes per second. Most importantly these tags can read/write data through virtually any non-conductive material and are unaffected by paint, dust, dirt and solvents. The compact size and long range of the antenna makes it ideal for use in commercial settings, where space is at a premium.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A computer implemented method of marketing to a customer of a business establishment, the method performed by a computer system, the method comprising:
   detecting an interaction of the customer with a website associated with the business establishment, and storing a website event based on the detected interaction;
   detecting a presence of the customer within the business establishment by virtue of a wireless device carried by the customer;
   determining an identity of the customer based on the customer's wireless device;
   storing a plurality of wirelessly tracked events of the customer within the business establishment including a detected customer interaction with at least one product, the plurality of tracked events occurring before a purchase transaction by the customer at a point of sale device; and
   determining, by the computer system, prior to the purchase transaction a marketing message for the identified customer based on the tracked events.

2. The method of claim 1, wherein determining the marketing message comprises:
   determining the marketing message using customer preferences of the customer.

3. The method of claim 1, wherein determining a marketing message comprises:
   determining an incentive to provide to the customer prior to the purchase transaction using a profile of the customer, the profile including the stored website event.

4. The method of claim 3, further comprising:
   wirelessly detecting the customer at the point of sale device based the presence of the wireless device carried by the customer being proximate to the point of sale device; and
   providing the incentive to the customer at the point of sale device.

5. The method of claim 3, further comprising sending the incentive to the customer on the customer's portable device.

6. The method of claim 1, wherein determining a marketing message comprises:
   determining the marketing message using a preference of the customer, wherein the preference of the customer is stored in the customer profile.

7. The method of claim 6, wherein the preference of the customer is a preferred product type.

8. The method of claim 6, wherein the preference of the customer is a preferred product characteristic.

9. The method of claim 6, wherein the preference of the customer is a preferred level of service.

10. The method of claim 6, wherein the preference of the customer is a preferred engagement level.

11. The method of claim 1, wherein determining the marketing message comprises retrieving a customer profile.

12. The method of claim 11, wherein the customer profile includes a status of the customer and the status of the customer is based on both the stored wirelessly tracked events and the website event.

13. The method of claim 11, wherein the customer profile includes an average amount of time the customer spends in the business establishment, based upon the wirelessly tracked events.

14. The method of claim 11, wherein the customer profile includes a department of the business establishment that the customer is most likely to visit, based upon the wirelessly tracked events.

15. The method of claim 1, wherein the marketing message includes a description of a product which was part of a previous interaction of the customer with the website associated with the business establishment.

16. The method of claim 1, wherein the marketing message includes at least one product or service to cross sell to the customer.

17. The method of claim 1, wherein the marketing message is sent directly to a mobile device of the customer.

18. The method of claim 1, further comprising:
   determining, based upon the wirelessly tracked events, an area of the business establishment in which the customer was present;
   determining at least one product associated with the determined area; and
   including in the marketing message the at least one product to cross sell to the customer.

19. The method of claim 1, wherein wirelessly detecting within the business establishment the wireless device carried by the customer further comprises:
   wirelessly detecting the wireless device within an entrance area of the business establishment.

20. The method of claim 1, wherein wirelessly detecting the customer's interactions with at least one product comprises:
   wirelessly detecting the customer's wireless device within predetermined locations within the business establishment.

21. The method of claim 1, wherein wirelessly detecting the customer's interactions with at least one product comprises:
   determining a particular department of the business establishment that the customer is in based upon a location of a wireless reader in the particular department reading the customer's wireless device.

22. The method of claim 1, further comprising:
   determining an amount of time spent by the customer in a single area of the business establishment based upon an amount of time the customer's wireless device is proximate to at least one wireless reader within the single area; and
   responsive to the amount of time exceeding a threshold, sending a marketing message to the customer.

23. The method of claim 1, further comprising:
   determining an average amount of time spent by the customer in the business establishment based upon an amount of time the customer's wireless device is present within the business establishment; and
   responsive an amount of time of a current visit of the customer to the business establishment exceeding a predetermined percentage of the average time, sending the marketing message to the customer.

24. The method of claim 1, wherein wirelessly detecting the customer's interactions with at least one product comprises:
determining whether the customer is near the point of sale device, based upon the customer's wireless device being proximate a wireless reader at the point of sale device.

25. The method of claim 1, wherein the customer's wireless device is a financial institution card carried by the customer.

26. The method of claim 1, wherein the customer's wireless device is a smart card carried by the customer.

27. The method of claim 1, wherein the customer's wireless device is a mobile phone carried by the customer.

28. The method of claim 1, wherein the customer's wireless device is an RFID tag carried by the customer.

29. The method of claim 1, wherein wirelessly detecting the customer's interactions with at least one product occurs without requiring a line of sight between a wireless system and the customer's wireless device.

30. The method of claim 1, wherein determining an identity of the customer further comprises:
determining a status of the customer on a tiered scale, and wherein the marketing message is determined based at least in part on the status of the customer, and the status is based upon at least the website event.

31. The method of claim 30, wherein wirelessly detecting the customer's interactions with at least one product comprises:
wirelessly detecting the customer's wireless device using a wireless reader proximate to the at least one product.

32. The method of claim 1, wherein the marketing message includes an image of the customer.

33. The method of claim 1, wherein the marketing message includes a probable location of the customer based on the wirelessly tracked events associated with the customer.

34. The method of claim 33, wherein the marketing message includes an indicator of a physical location of the customer within the business establishment.

35. The method of claim 1, further comprising updating a history of the customer based on the wirelessly tracked events of the customer within the business establishment.

36. The method of claim 1, further comprising:
selecting product information based at least on a customer history of the customer;
determining a location of the customer within the business establishment; and
outputting the product information on an output device near the location of the customer.

37. The method of claim 1, further comprising:
determining a location of the customer within the business establishment;
selecting product information based at least on the location of the customer within the business establishment and a tracked event of the customer; and
outputting the product information on an output device near the location of the customer.

38. The method of claim 1, further comprising:
determining at least one product potentially viewed by the customer within the business establishment; and
associating the customer with the determined products.

39. The method of claim 1, further comprising:
receiving feedback from the customer; and
storing the feedback in association with a customer history of the customer, for use in creating a future marketing message.

40. The method of claim 1, further comprising:
determining a frequency of transactions of the customer with the business establishment for at least one of a type of product, or a specific product.

41. The method of claim 1, further comprising:
determining a purchase history of the customer based on prior transactions of the customer with the business establishment.

42. The method of claim 1, further comprising:
determining an average length of a visit of the customer to the business establishment based on the tracked events.

43. A computer implemented method of managing a business establishment, the method performed by a computer system, the method comprising:
detecting a transaction of a customer with a website associated with the business establishment, and storing a website event based on the detected transaction;
wirelessly detecting within the business establishment a wireless device carried by the customer;
wirelessly tracking locations of the customer within the business establishment by tracking the customer's wireless transponder;
determining, prior to a purchase transaction by the customer, an identity of the customer based on the wireless device carried by the customer;
identifying, prior to the purchase transaction, the customer as having a preferred status with the business establishment, the preferred status based on at least the website event of the customer and prior transactions of the customer within the business establishment;
determining by the computer system, prior to the purchase transaction, a marketing message specific to the identified customer based on the preferred status; and
outputting the marketing message.

44. The method of claim 43, further comprising:
displaying a representation of the location of the preferred status customer within the business establishment.

45. A non-transitory computer-readable storage medium storing computer-executable program instructions for providing marketing to a customer of a business establishment, the instructions when executed by one or more processors cause the one or more processors to perform steps including:
detecting an interaction of the customer with a website associated with the business establishment, and storing a website event based on the detected interaction;
detecting a presence of the customer within the business establishment by virtue of a wireless device carried by the customer;
determining an identity of the customer based on the customer's wireless device;
storing a plurality of wirelessly tracked events of the customer within the business establishment including a detected customer interaction with at least one product, the plurality of tracked events occurring before a purchase transaction by the customer at a point of sale device; and
determining prior to the purchase transaction a marketing message for the identified customer based on the tracked events.

46. The non-transitory computer-readable storage medium of claim 45, further comprising:
wirelessly detecting the customer at the point of sale device based the presence of the wireless device carried by the customer being proximate to the point of sale device; and
providing the incentive to the customer at the point of sale device.

47. The non-transitory computer-readable storage medium of claim 46, further comprising sending the incentive to the customer on the customer's portable device.

48. The non-transitory computer-readable storage medium of claim 45, wherein determining the marketing message comprises retrieving a customer profile.

49. The non-transitory computer-readable storage medium of claim 48, wherein the customer profile includes an average amount of time the customer spends in the business establishment, based upon the wirelessly tracked events.

50. The non-transitory computer-readable storage medium of claim 45, wherein wirelessly detecting the customer's interactions with at least one product comprises:
   determining a particular department of the business establishment that the customer is in based upon a location of a wireless reader in the particular department reading the customer's wireless device.

51. The non-transitory computer-readable storage medium of claim 45, further comprising:
   determining an amount of time spent by the customer in a single area of the business establishment based upon an amount of time the customer's wireless device is proximate to at least one wireless reader within the single area; and
   responsive to the amount of time exceeding a threshold, sending a marketing message to the customer.

52. The non-transitory computer-readable storage medium of claim 45, further comprising:
   determining an average amount of time spent by the customer in the business establishment based upon an amount of time the customer's wireless device is present within the business establishment; and
   responsive an amount of time of a current visit of the customer to the business establishment exceeding a predetermined percentage of the average time, sending the marketing message to the customer.

53. A computer implemented method of marketing to a customer of a business establishment, the method performed by a computer system, the method comprising:
   detecting an interaction of the customer with a website associated with the business establishment, and storing a website event based on the detected interaction;
   detecting a presence of the customer within the business establishment by virtue of a wireless device carried by the customer;
   determining an identity of the customer based on the customer's wireless device;
   storing a plurality of wirelessly tracked events of the customer within the business establishment including a detected customer interaction with at least one product, the plurality of tracked events occurring before a purchase transaction by the customer at a point of sale device;
   determining prior to a purchase transaction by the customer, an identity of the customer based on the customer's wireless device;
   identifying, prior to the purchase transaction, a status of the customer with the business establishment on a tiered status scale, the status of the customer based on at least the website event of the customer and the plurality of wirelessly tracked events of the customer within the business establishment;
   determining by the computer system prior to the purchase transaction a marketing message for the identified customer based on the customer's status, the website event and the wirelessly tracked events within the business establishment, the marketing message including an incentive available to the customer based on the status; and
   outputting the marketing message to the customer.

54. The method of claim 53, further comprising:
   wirelessly detecting the customer at the point of sale device based the presence of the wireless device carried by the customer being proximate to the point of sale device; and
   providing the incentive to the customer at the point of sale device.

55. The method of claim 53, further comprising sending the incentive to the customer on the customer's portable device.

56. A non-transitory computer-readable storage medium storing computer-executable program instructions for providing marketing to a customer of a business establishment, the instructions when executed by one or more processors cause the one or more processors to perform steps including:
   detecting an interaction of the customer with a website associated with the business establishment, and storing a website event based on the detected interaction;
   detecting a presence of the customer within the business establishment by virtue of a wireless device carried by the customer;
   determining an identity of the customer based on the customer's wireless device;
   storing a plurality of wirelessly tracked events of the customer within the business establishment including a detected customer interaction with at least one product, the plurality of tracked events occurring before a purchase transaction by the customer at a point of sale device;
   determining prior to a purchase transaction by the customer, an identity of the customer based on the customer's wireless device;
   identifying, prior to the purchase transaction, a status of the customer with the business establishment on a tiered status scale, the status of the customer based on at least the website event of the customer and the plurality of wirelessly tracked events of the customer within the business establishment;
   determining prior to the purchase transaction a marketing message for the identified customer based on the customer's status, the website event and the wirelessly tracked events within the business establishment, the marketing message including an incentive available to the customer based on the status; and
   outputting the marketing message to the customer.

57. The non-transitory computer-readable storage medium of claim 56, further comprising:
   wirelessly detecting the customer at the point of sale device based the presence of the wireless device carried by the customer being proximate to the point of sale device; and
   providing the incentive to the customer at the point of sale device.

58. The non-transitory computer-readable storage medium of claim 56, further comprising sending the incentive to the customer on the customer's portable device.

* * * * *